(12) United States Patent
Gasbarro

(10) Patent No.: US 11,266,157 B2
(45) Date of Patent: **\*Mar. 8, 2022**

(54) APPARATUS AND METHOD FOR DEBONING POULTRY BREASTS

(71) Applicant: Prime Equipment Group, LLC, Columbus, OH (US)

(72) Inventor: Michael Gasbarro, Columbus, OH (US)

(73) Assignee: Prime Equipment Group, LLC, Columbus, OH (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/821,412

(22) Filed: Mar. 17, 2020

(65) Prior Publication Data

US 2020/0214302 A1 Jul. 9, 2020

Related U.S. Application Data

(63) Continuation of application No. 16/238,789, filed on Jan. 3, 2019, now Pat. No. 10,595,539.

(60) Provisional application No. 62/613,234, filed on Jan. 3, 2018.

(51) Int. Cl.
*A22C 21/00* (2006.01)

(52) U.S. Cl.
CPC ........ *A22C 21/0069* (2013.01); *A22C 21/003* (2013.01); *A22C 21/0023* (2013.01)

(58) Field of Classification Search
CPC . A22C 21/00; A22C 21/0069; A22C 21/0003; A22C 21/0023

USPC ........ 452/135, 149–155, 160, 165, 166, 169
See application file for complete search history.

(56) References Cited

U.S. PATENT DOCUMENTS

| | | | | |
|---|---|---|---|---|
| 4,935,990 | A * | 6/1990 | Linnenbank | A22C 21/0023 452/167 |
| 4,937,918 | A | 7/1990 | Martin | |
| 6,007,416 | A * | 12/1999 | Janssen | A22C 21/003 452/135 |
| 60,007,416 | | 12/1999 | Janssen et al. | |
| 7,232,365 | B2 * | 6/2007 | Annema | A22C 21/0076 452/167 |
| 7,335,095 | B2 * | 2/2008 | Sekiguchi | A22C 21/0023 452/169 |
| 7,341,505 | B1 * | 3/2008 | Gasbarro | A22C 21/0023 452/169 |
| 8,678,887 | B2 | 3/2014 | Evers | |
| 8,702,480 | B1 * | 4/2014 | Ray | A22C 21/0084 452/169 |

\* cited by examiner

*Primary Examiner* — Richard T Price, Jr.
(74) *Attorney, Agent, or Firm* — Christensen O'Connor Johnson Kindness PLLC

(57) ABSTRACT

A poultry breast deboning apparatus and method for guiding a plurality of poultry combinations that have a breast and attached wings, the apparatus including a transport assembly with carts mounted to a drive system. Each of the carts has an opening to receive one of the wings of each combination. Moveable cutters are disposed adjacent the transport assembly for seating against the carts for severing tissue connecting the wings and the breast. Moveable bars are biased to urge the wings into the cart openings.

12 Claims, 17 Drawing Sheets

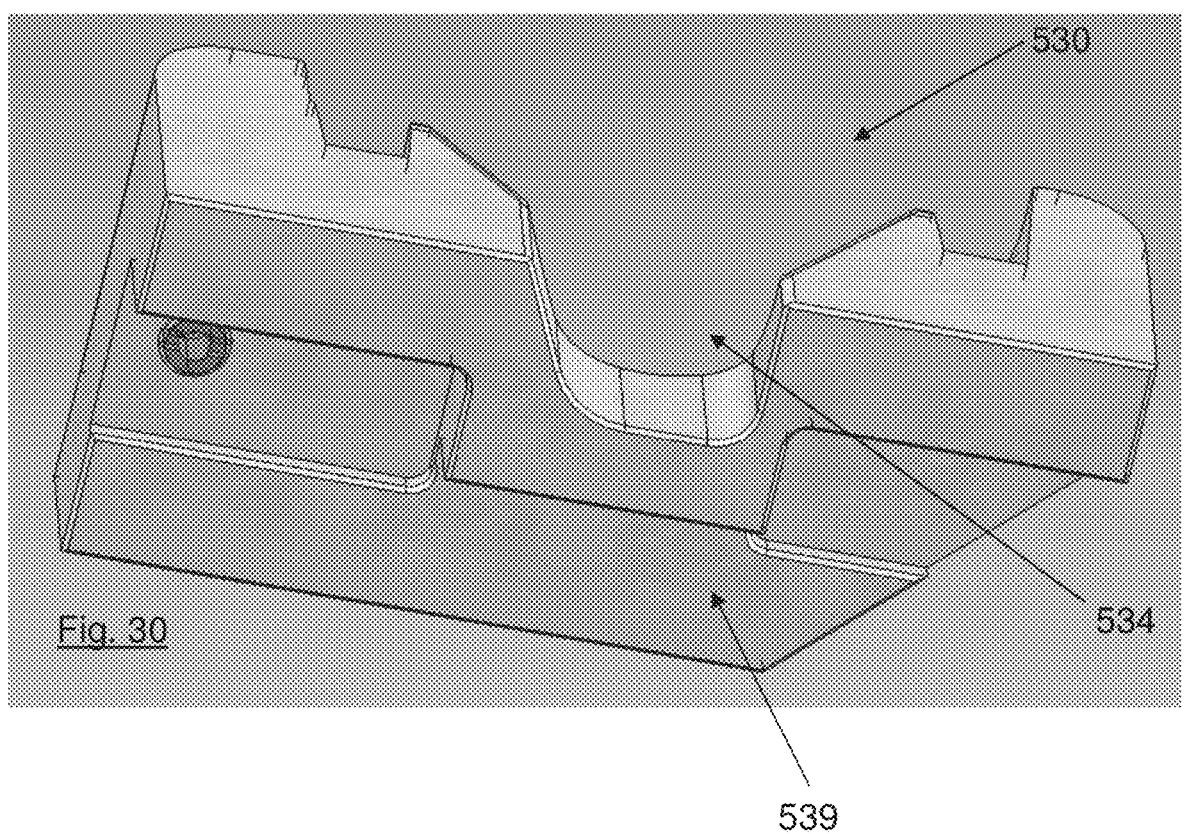

APPARATUS AND METHOD FOR DEBONING POULTRY BREASTS

CROSS-REFERENCES TO RELATED APPLICATIONS

This application is a continuation of U.S. patent application Ser. No. 16/238,789, filed Jan. 3, 2019, which claims the benefit of U.S. Provisional Application No. 62/613,234, filed Jan. 3, 2018, both of which applications are incorporated herein by reference in their entireties.

BACKGROUND

The invention relates to machines and processes for removing consumable muscle and other products from poultry and other animals, and more particularly to machines and processes for removing the wings from the breast of poultry.

It is well known to use a machine for removing muscle from the carcass of poultry and other animals that have been raised for food. An example of this is shown and described in U.S. Pat. No. 4,937,918 to Martin. A video of conventional technology may be viewed at youtube.com/watch . . . v=AjL9UM8b8_U.

In some prior art machines and processes, a conventional cone line is used to transport poultry carcasses along the machine's components. The process starts with a carcass on each cone with the breasts facing upstream and the back facing downstream. Downstream is the direction the cones move toward. Typically one person loads the cones and, after the carcasses are on the cones, one or more others make shoulder cuts using hand-held knives to sever the tendons connecting the wings to the carcass.

Carcasses on cones may enter prior art machines at a lower region of an inclined structure where endless loop chains propel the wings of the carcass by grasping the wings between inclined, low-friction guides that the chains are mounted against and spaced tabs extending from the chains. The tabs may be spaced every 18 inches along the chains, which is similar to the distance between the cones. The chains are driven by one or more prime movers, such as electric motors.

Rails parallel to the path of the cones curve downwardly at entry to the inclined structure to guide the carcass toward the chains, and the top of these rails receive the undersides of the wings. Wheels that have radial tabs about every 30 degrees receive the wings at the end of the rails at the approach to the lower end of the inclined guides. This is where the carcass starts pivoting downstream. The wheels pick up each of the wings from the rails and seat them on the inclined guides. Tabs on the continuously moving chains are timed to immediately seat against the wings and begin to force the wings up the guides with the chains. The wings are thus placed between tabs and the guides and propelled downstream. The drumette segments of the wings are grasped between the chain tabs and the low-friction guides.

Poultry wings have three segments—the drumette, the mid-wing and the wingtip, and each has a bone and varied amounts of muscle and soft tissue. The drumette is the largest and the closest to the animal's body, while the wingtip is farthest and the smallest. All are connected to one another at joints by connective tissue. Typically, the drumettes are held between the tabs and the guides.

As the chains propel the wings and connected portions up the inclined guides, the cone that holds the carcass continues bending over in the downstream direction. This downstream and downward movement of the poultry carcass frame away from the downstream and upwardly-moving combination of the breast and wings continues to separate the readily-torn muscle holding the combination of the wings and the breast from the frame. As the cone continues to bend over, the cone and the frame pull completely away from the wings/breast combination. The carcass is removed beneath the inclined guides and is taken away separately.

As the breast hangs between the inclined guides, the guides support the bottom of the wings. The chains propel the wings/breast combination upwardly to an upper assembly that removes the wings from the breast. At the top of the inclined section, the prior art rotates the wings about 90 degrees and then simultaneously severs both wings from the breast using knives mounted on vertical axes of rotation, and the knives move in an up-and-down motion.

This process and mechanism, while superior to manual procedures, has room for improvement, including consistency in the amount of muscle left on each wing. As an example, these prior art machines cut the wings simultaneously away from the breast, and extend down from the top of the machine. This means both wings are cut under the same conditions of weight and angle. Therefore, the need exists for an improved breast deboning apparatus and process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is a poultry processing apparatus for separating poultry components. The apparatus comprises first and second elongated, substantially parallel guides for guiding a poultry product, which may include a breast and first and second attached wings, along the apparatus with the first wing resting upon the first guide and the second wing resting upon the second guide. The guides may have adjacent downstream ends. A transport assembly of the apparatus includes first and second carts mounted to a drive system. The drive system is for driving the carts from a loading position, adjacent the downstream ends of the first and second elongated guides, to a cutting station. The first and second carts each have an opening to receive a respective one of the wings of the poultry product when each cart is disposed in the loading position. The apparatus has first and second moveable cutters disposed adjacent the transport assembly at the cutting station. The cutters are configured for moving along a path and severing tissue connecting the wings and the breast.

In a preferred embodiment, first and second moveable positioning bars are mounted adjacent the downstream ends of the first and second elongated guides. The first and second bars are biased toward the cart openings. The bars are configured for moving away from the cart openings when the wings of the poultry product contact the first and second bars as the wings approach the downstream ends of the guides. The first and second bars are configured for moving toward the cart openings as the wings depart the downstream ends of the guides. The configuration causes the first and second bars to urge the wings into the respective cart openings.

In a more preferred embodiment, third and fourth moveable positioning bars are mounted adjacent the downstream ends of the first and second elongated guides on opposite sides of the first and second elongated guides from the first and second positioning bars. The third and fourth positioning bars are biased in the direction of the cart openings. The third and fourth bars are configured for moving away from the cart openings when the wings of the poultry product contact the third and fourth bars as the wings approach the downstream ends of the guides, and for moving toward the cart openings as the wings depart the downstream ends of the guides. The third and fourth bars thereby urge the wings into the respective cart openings.

In an alternative embodiment, a poultry processing apparatus comprises first and second elongated, substantially parallel guides. The guides are for guiding a plurality of poultry combinations, which may include a breast and first and second attached wings, along the apparatus with the first wing resting upon the first guide and the second wing resting upon the second guide. The guides may have adjacent downstream ends. A transport assembly includes a first plurality of serially-linked carts attached to a first endless loop and a second plurality of serially-linked carts attached to a second endless loop. The loops are drivingly linked to a prime mover for driving the loops and the attached carts from a loading position adjacent the downstream ends of the first and second elongated guides to at least one cutting station that is downstream of the loading position. Each of the carts of the first and second plurality of carts have an opening to receive a respective one of the wings of one of the poultry combinations when each cart is disposed in the loading position. First and second positioning bars are pivotably-mounted adjacent the downstream ends of the first and second elongated guides, respectively. The positioning bars are configured to be forced away from the respective openings as the wings of each poultry combination contact the respective positioning bars as the wings approach the downstream ends of the guides. The first and second positioning bars are biased to move toward the respective cart openings as the wings depart the downstream ends of the guides. The positioning bars thereby urge the wings into the openings of a respective one of the first and second carts. The apparatus further comprises first and second moveable cutters disposed at the cutting station and configured for moving along a path, seating against a respective one of the carts and severing tissue connecting the wings and the breast.

In one embodiment, the cutters are disposed at least partially between the first and second plurality of carts and configured to move along a path having a horizontal component. In one embodiment, a first rail is mounted substantially parallel to at least one span of the first endless loop and within a path through which the first plurality of carts passes. The first rail defines a limit to resist withdrawal of a wing mounted in the corresponding opening of each cart. A second rail is mounted substantially parallel to at least one span of the second endless loop and within a path through which the second plurality of carts passes. The second rail defines a limit to resist withdrawal of a wing mounted in the corresponding opening of each cart. In one embodiment, each of the carts in the first plurality of carts has a longitudinal slot through which the first rail passes, and each of the carts in the second plurality of carts has a longitudinal slot through which the second rail passes.

Disclosed herein is a method of processing poultry comprising the step of displacing first and second poultry wings, which are attached to a poultry breast, along first and second elongated, substantially parallel guides having adjacent downstream ends. The method comprises a step of disposing first and second carts, each of which has an opening to receive a respective one of the wings, at a loading position adjacent respective downstream ends of the guides. The method comprises moving at least first and second positioning bars mounted adjacent the downstream ends of the first and second elongated guides away from the first and second carts as the first and second wings are displaced toward the downstream ends. The method comprises moving the positioning bars toward the openings in the first and second carts as the wings depart the downstream ends of the guides, the positioning bars thereby urging the wings into the openings of the first and second carts. The method comprises displacing the first and second carts, and the wings held within the openings therein, downstream to at least one cutting station, moving a first moveable cutter at the cutting station along a path, thereby seating against and severing tissue connecting the first wing and the breast, and moving a second moveable cutter at the cutting station along a path, thereby seating the second cutter against and severing tissue connecting the second wing and the breast.

In one embodiment, the steps of moving the first and second cutters are carried out substantially simultaneously. In one embodiment, the steps of moving the first and second cutters are carried out sequentially, wherein the steps of moving the first and second moveable cutters further comprise moving the first and second moveable cutters along the paths, each of which has a horizontal component.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 30 is a view in perspective illustrating the bottom of the embodiment of FIG. 28.

Figure 1:
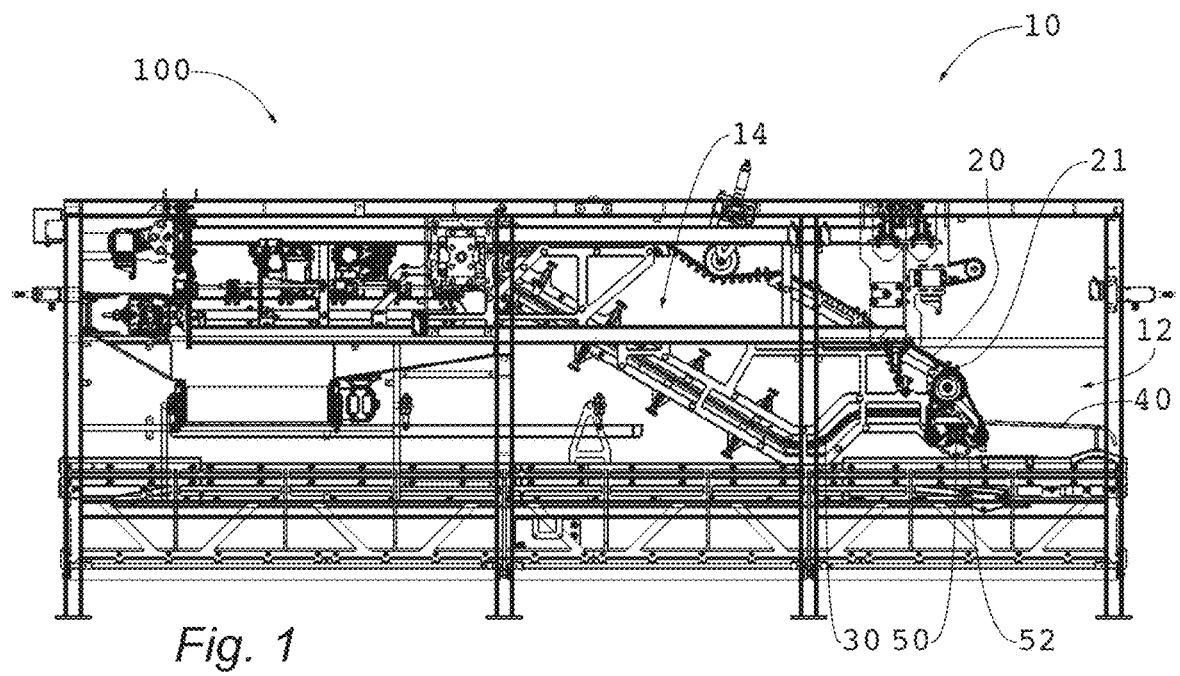
FIG. 1 is a left side view illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION

U.S. Provisional Application No. 62/613,234 filed Jan. 3, 2018, is hereby incorporated by reference.

In the apparatus 10 shown in FIG. 1, a cone line may be used to transport poultry carcasses to the entry end 12, which is shown in FIG. 1 at the right, but this location is not critical. A poultry carcass, which may be chicken, turkey, Cornish hen, grouse, quail, or any other bird, is disposed on each of the cones in a conventional manner with the breasts facing upstream. A person or an automated mechanism, such as a robot, may load the carcasses on the cones and one or more other people downstream (the leftward direction in the orientation of FIG. 1) may make shoulder cuts using hand-held knives to sever the tendons connecting the wings to the carcass. Loading and shoulder cutting occurs upstream (the rightward direction in FIG. 1) of the apparatus 10.

Carcasses enter the apparatus 10 first at a lower region just upstream of an inclined, declined or horizontal structure 14. The rails 40 are generally parallel to the path that the cones follow, and the rails 40 curve downwardly at an upstream, entry end 12 to direct an entering carcass toward the structure 14 by the tops of the rails 40 receiving the undersides of the wings. Endless loop chains 20 and 22 are driven along the structure 14 by one or more prime movers, such as servomotors (not visible in FIG. 1). The chains 20 and 22 propel the wings along the parallel, low-friction, inclined guides 30 and 32 that the chains 20 and 22 are mounted against using spaced tabs 21 and 23 that extend from the chains 20 and 22, respectively. The guide 32, chain 22 and tabs 23 are best viewed in FIG. 4, and the guide 30 and corresponding chain 20 are identical and spaced from the guide 32 a predetermined distance. The tabs 21 and 23 may be spaced every 18 inches along the respective chains, which is similar to the distance between the cones that convey the carcasses.

Wheels 50 and 52 have radial protrusions that, when the wheels 50 and 52 are rotating, raise a respective carcass's wings from the rails 40 and seat each of the wings on one of the guides 30 and 32. The tabs 21 and 23 mounted to the continuously moving chains 20 and 22 are timed to abut the upstream sides of the wings just after the wings are seated on the guides 30 and 32 by the wheels 50 and 52 to force the wings downstream along the guides 30 and 32 after the wheels 50 and 52 lose contact with the wings. This is repeated for each subsequent carcass. Pairs of wings of each carcass are thus placed between the tabs 21 and 23 that are mounted to the roller chains 20 and 22 and the inclined guides 30 and 32, and are propelled downstream in series with other carcasses. The drumette segments of the wings may be the segments grasped between the chains 20 and 22 and the inclined guides 30 and 32.

As the chains 20 and 22 propel each pair of wings along the guides 30 and 32, each corresponding cone bends over in the downstream direction at a specified point along the path. As each cone continues to bend over, the associated wings and breast, which are held tightly between the chains 20 and 22 and the guides 30 and 32, separate completely from the cone and the rest of the carcass on the cone. The separated carcass is removed beneath the guides 30 and 32 and is taken away separately by the cone. This leaves the breast muscle hanging between the pair of wings with the guides 30 and 32 supporting the bottoms of the wings and the breast muscle positioned between the guides 30 and 32. The chains 20 and 22 propel the wings/breast combination further downstream.

Figure 2:
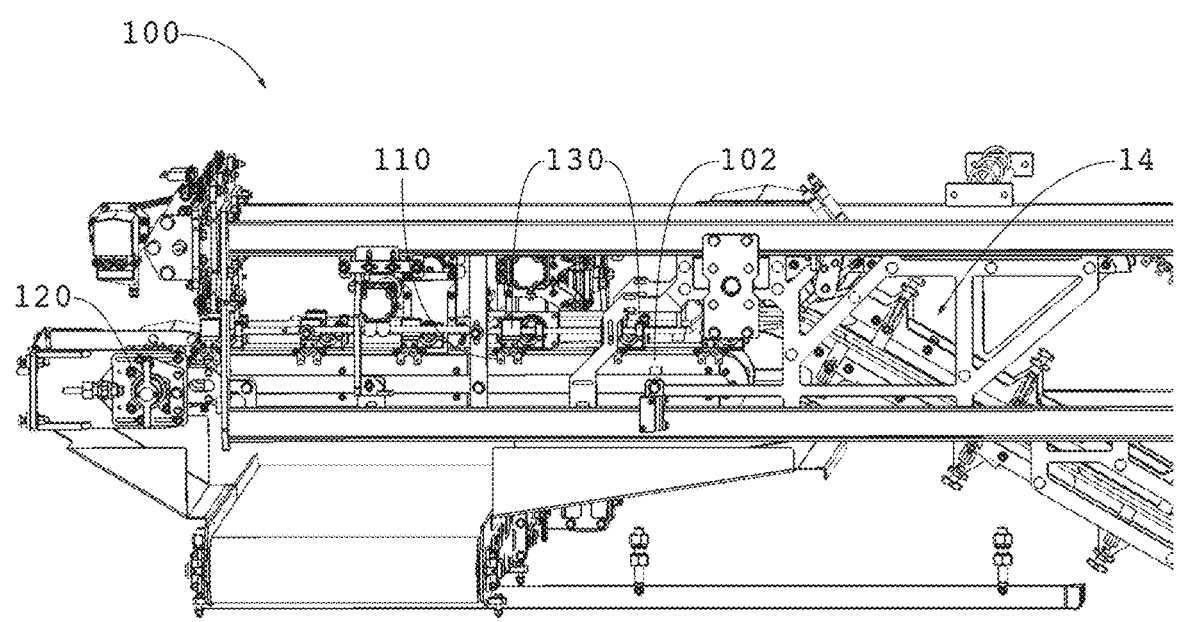
FIG. 2 is a left side view in perspective illustrating a transport assembly of the apparatus shown in FIG. 1.
Figure 3:
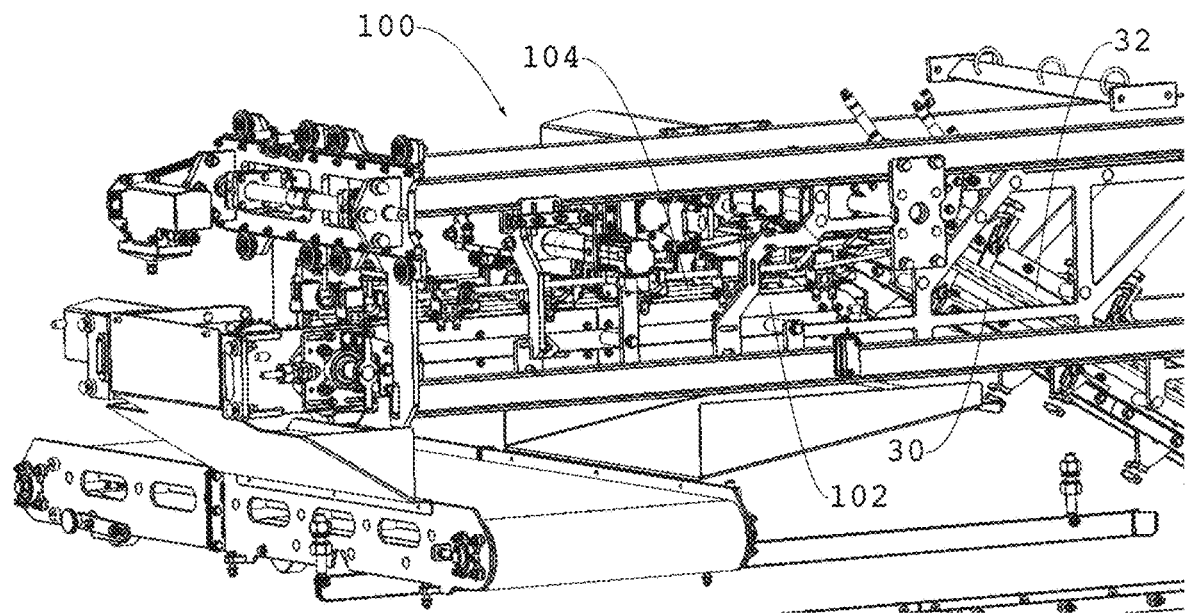
FIG. 3 is a view in perspective illustrating the transport assembly of FIG. 2.
Figure 4:
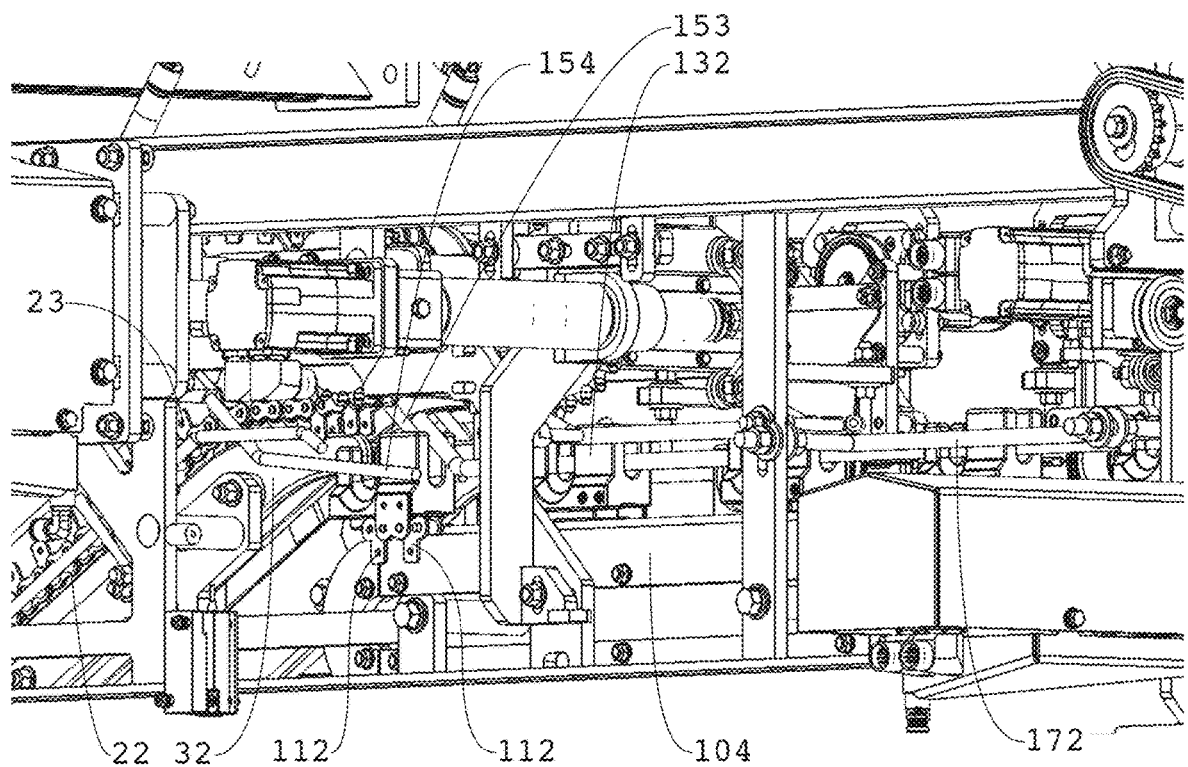
FIG. 4 is a right side view in perspective illustrating the transport assembly of FIG. 2.

At the downstream end of the guides 30 and 32, which is the upper end in the embodiment of FIG. 1, each wings/breast combination departs the guides 30 and 32 by transfer to a transport assembly 100, which transport assembly 100 is shown in greater detail in FIGS. 2-6 and 10-12 and is described below. The upstream end of the transport assembly 100 is adjacent the downstream ends of the guides 30 and 32 as shown in FIGS. 3 and 16-20. The transport assembly 100 has first and second elongated guides 102 and 104 with upstream ends adjacent the downstream ends of the respective guides 30 and 32. Each of the guides 102 and 104 may be a generally flat strip of low-friction material, such as a polymer, with rounded ends. An endless loop drive, such as the roller chains 110 and 112, may extend around the guides 102 and 104, respectively, in the manner that the cutting chain of a conventional chainsaw extends around the bar of the chainsaw. The chains 110 and 112 may have aligned tabs that extend into a slot on the guides 102 and 104, or tabs may extend in pairs on opposite sides of the guides 102 and 104 to maintain the guides 102 and 104 between each pair of tabs. The chains 110 and 112 extend around the guides 102 and 104 with long spans aligned essentially horizontally as shown in FIGS. 2 and 4. In some illustrations, such as FIG. 5, the chains 110 and 112 are only shown in part for simplification, but it will be understood that the chains 110 and 112 extend entirely around the guides 102 and 104.

The chains 110 and 112 are driven around the upper and lower spans of the guides 102 and 104 by one or more drivingly linked prime movers, such as an electric servomotor 120, or any other suitable prime mover. The chains 110 and 112 have serially-attached structures, such as the carts 130 and 132, that are moved along with the chains. There are preferably multiple similar carts mounted to each of the chains 110 and 112, and the carts are aligned laterally in pairs as shown by the cards 130E and 132E in FIG. 6. Thus, at multiple longitudinal locations along the transport assembly 100, carts are arranged in laterally-aligned pairs to cooperate and hold the opposite wings in each wings/breast combination in the apparatus 10. Each aligned pair of carts 130N and 132N (where "N" represents a variable assigned to each cart to distinguish it from all other serially-connected and substantially identical carts) conveys an associated wings/breast combination downstream along the guides 102 and 104 at the same speed.

During operation, the servomotor 120 rotates gears and/or sprockets that drive the chains 110 and 112 around the guides 102 and 104 at the same speed. This movement of the chains 110 and 112 moves the attached carts 130N and 132N along the guides. The chains 110 and 112 on the guides 102 and 104 may be paused briefly between periods of movement. The chains 20 and 22 that transport the wings/breast combination to the transport assembly 100 may move continuously. In one embodiment, the chains 110 and 112 are moved in the same direction and at the same speed with momentary pauses when poultry limbs, such as wings, are transferred from the chains 20 and 22 into the carts 130 and 132 as described below. It is contemplated that the pausing of the chains 110 and 112 may correspond with the timing of the tabs 21 and 23 of the chains 20 and 22 reaching the downstream ends of the guides 30 and 32. Thus, by pausing the movement of the chains 110 and 112 just before the tabs 21 and 23 on the continuously-moving chains 20 and 22 reach the downstream ends of the guides 30 and 32, the wings displaced by the tabs 21 and 23 may be received in the stationary carts 130N and 132N that are mounted to the paused chains 110 and 112 and positioned adjacent the downstream ends of the guides 30 and 32.

Each of the carts 130N and 132N has a corresponding opening that faces upwardly when the carts 130N and 132N are disposed on the respective upwardly-facing sides of the guides 102 and 104. In particular, the opening of each cart faces upwardly when a respective pair of carts is at the upstream end of the transport assembly 100 (adjacent the downstream ends of the guides 30 and 32) to receive a poultry wing. The upstream end of the transport assembly 100 may be referred to as the loading position of the carts. In this cart position and orientation, gravity assists in inserting the wings into the upwardly-facing openings, and in retaining the wings in the openings. However, it will be understood that a person of ordinary skill may modify the size and/or orientation of the apparatus as disclosed herein to insert limbs into the carts when the openings face a direction different from upward. The cart opening is desirably sized to receive the drumette segment, or a portion thereof, but it is also contemplated that the opening may be sized to receive another segment of the wing.

Figure 5:
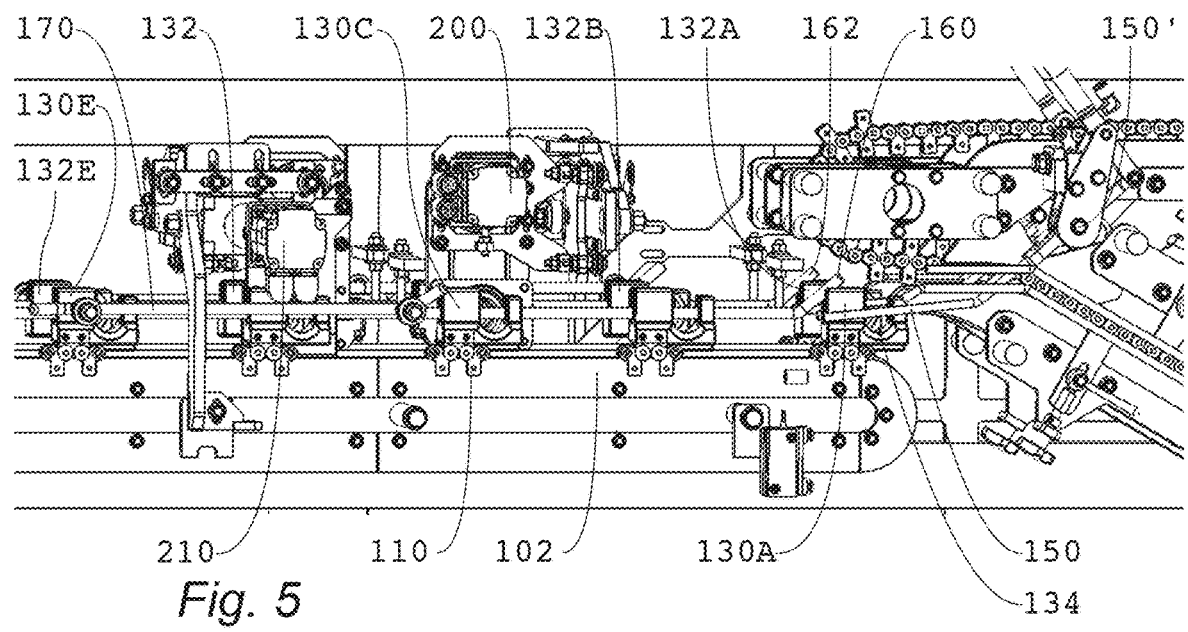
FIG. 5 is a left side view in perspective illustrating the transport assembly of FIG. 2 in further magnification and with some structures removed for enhanced visibility.
Figure 6:
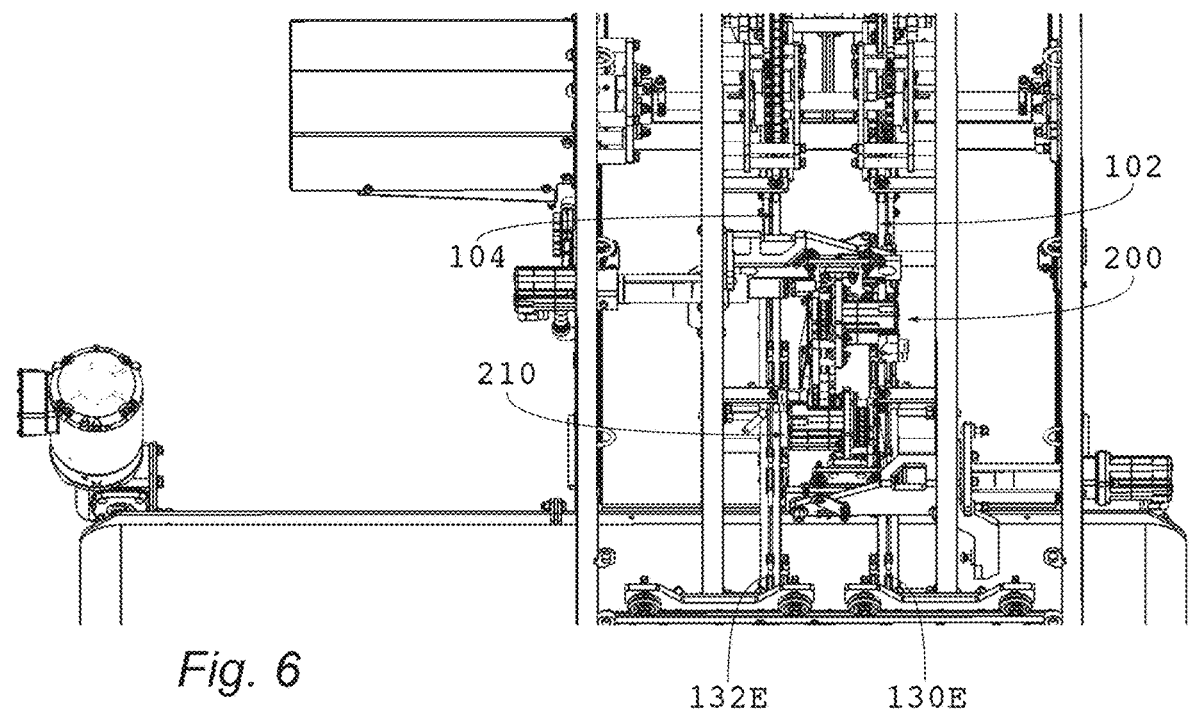
FIG. 6 a top view illustrating the transport assembly of FIG. 2.
Figure 7:
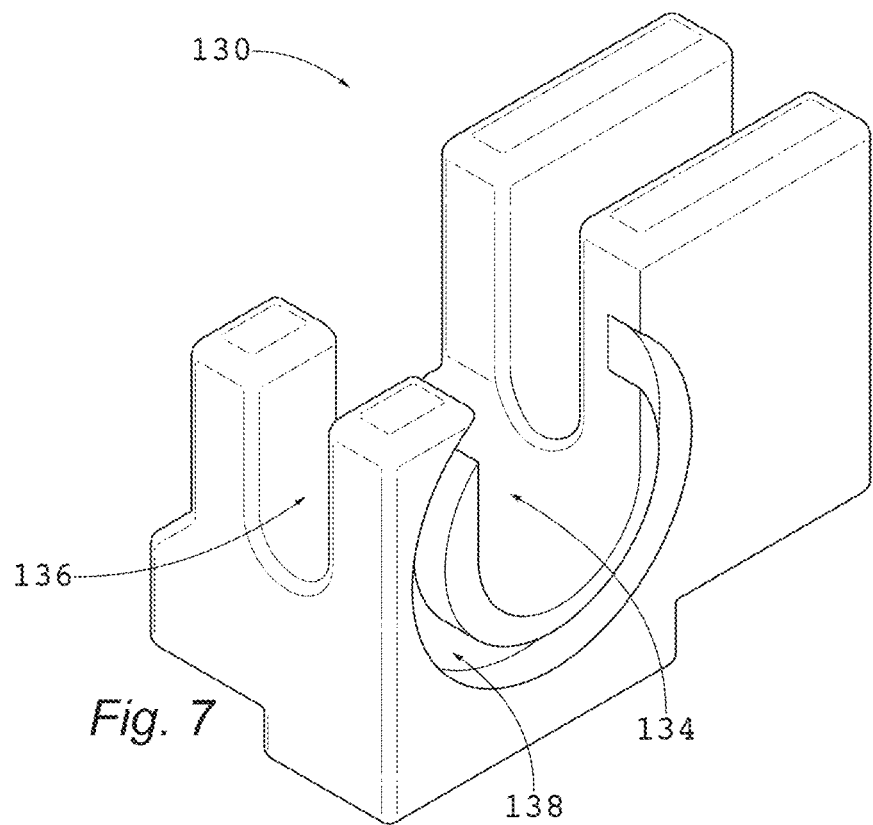
FIG. 7 is a view in perspective illustrating an embodiment of a cart.
Figure 8:
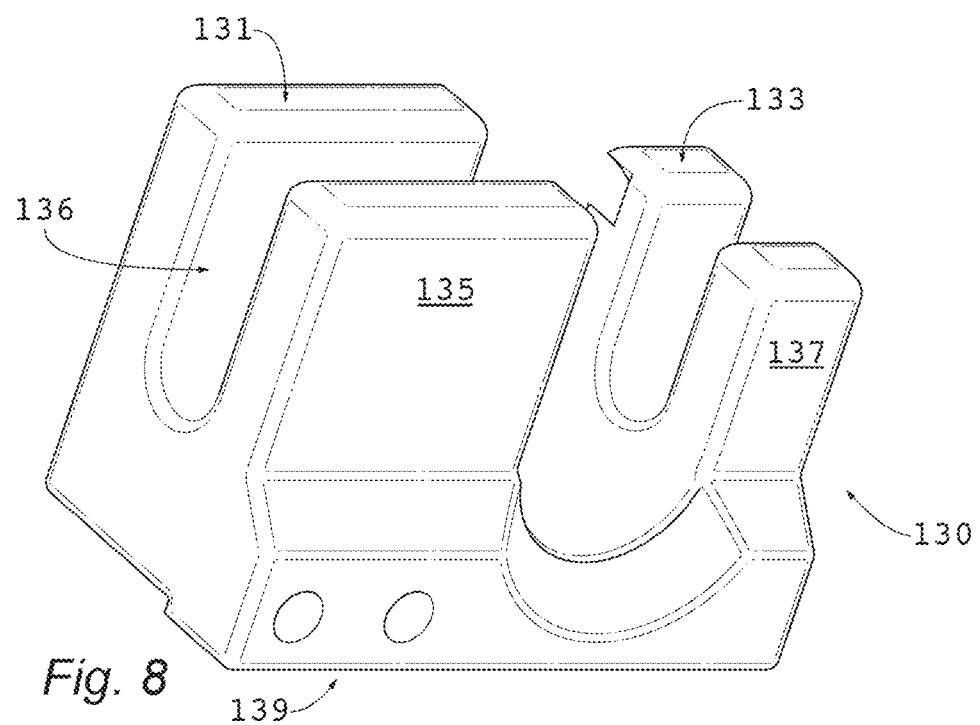
FIG. 8 is a view in perspective illustrating the embodiment of FIG. 7.
Figure 9:
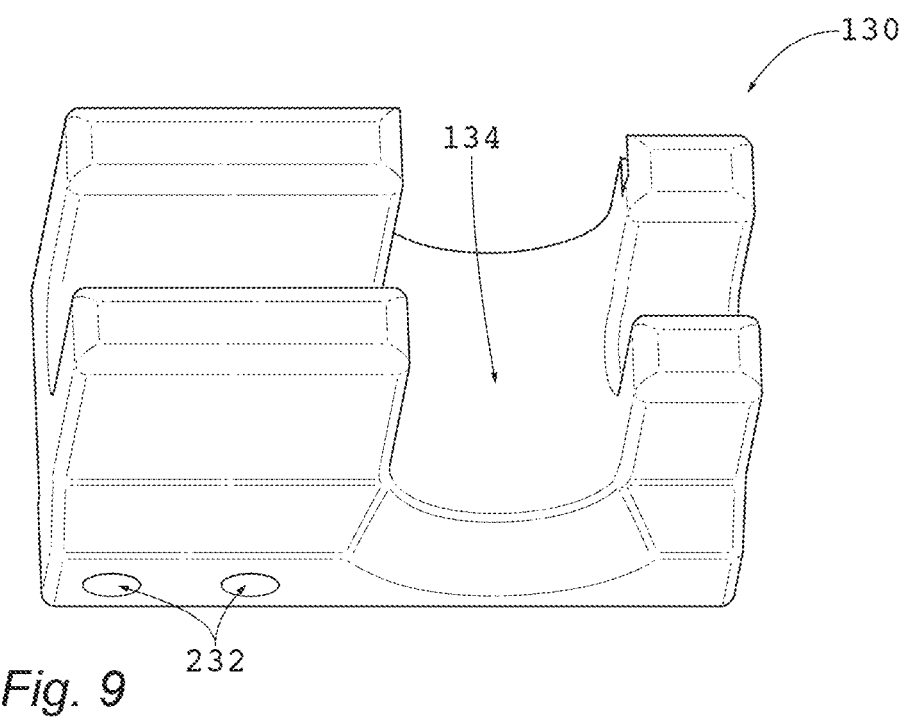
FIG. 9 is a view in perspective illustrating the embodiment of FIG. 7.
Figure 13:
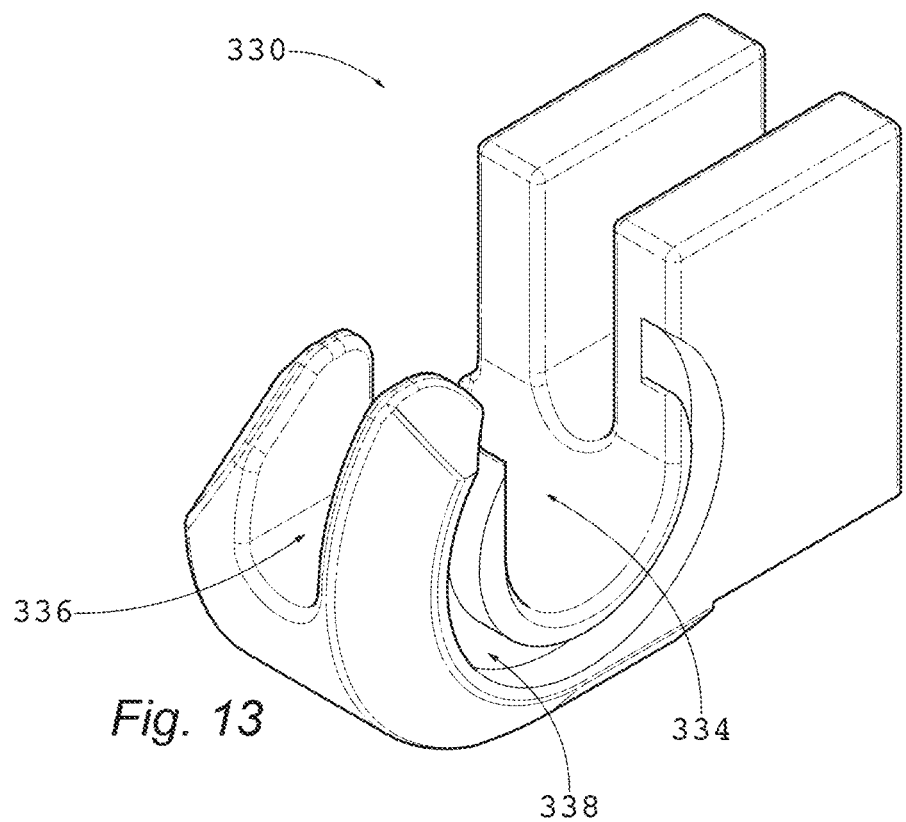
FIG. 13 is a view in perspective illustrating an embodiment of a cart.
Figure 14:
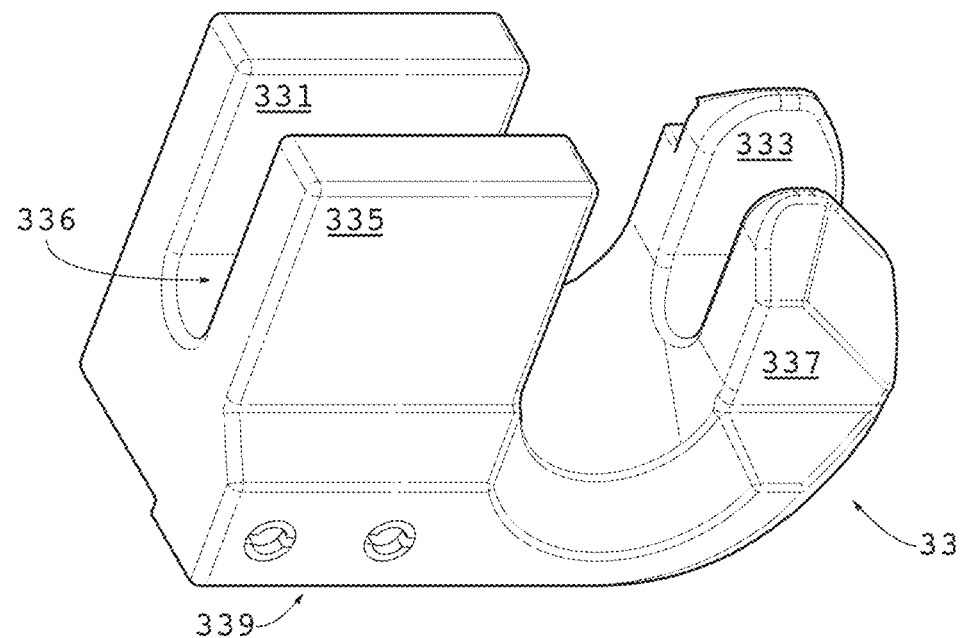
FIG. 14 is a view in perspective illustrating the embodiment of FIG. 13.
Figure 15:
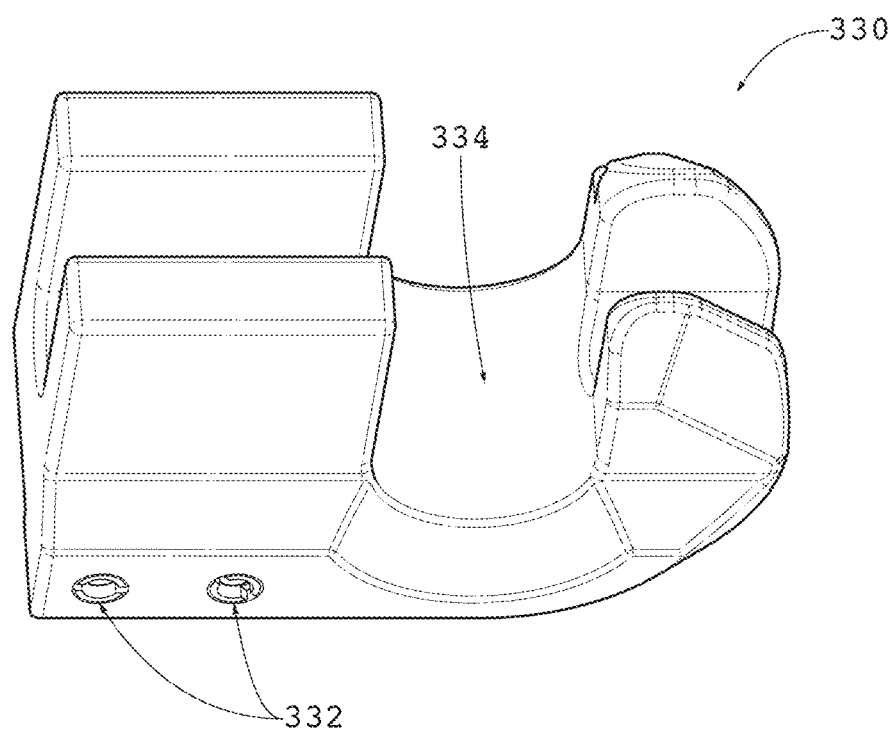
FIG. 15 is a view in perspective illustrating the embodiment of FIG. 13.

The carts 130N and 132N are viewed in an operable position in FIG. 5 pivotably mounted to the chains 110 and 112, respectively. Each of the carts 130N and 132N shown in FIGS. 1-5 is substantially identical, and therefore only one such cart 130 will be described herein in detail in association with FIGS. 7-9, which show a magnified cart. However, it will be understood that all other carts of the embodiment of FIGS. 1-12 not noted herein as differing have similar features to the cart 130. Various cart shapes, sizes and configurations (such as the carts shown in FIGS. 13-15) may be substituted for the cart 130 shown in FIGS. 7-9, and the person of ordinary skill will understand that changes to the carts may be made with corresponding advantages and disadvantages.

The cart 130 has four protruding members 131, 133, 135 and 137, which may be substantially parallel and may define two voids in the spaces therebetween: the opening 134 and the groove 136. The opening 134 extends along an axis that is transverse, and may be substantially perpendicular to, the longitudinal axis of the cart 130, and in operation the opening 134 may receive a wing or other limb of the poultry product being processed. The groove 136 extends along an axis that is substantially parallel to the longitudinal axis of the cart 130 and during operation the groove 136 receives a rail (described below) that retains the wing in the opening 134. The deepest reaches of the groove 136 may not extend as far as the deepest reaches of the opening 134, thereby providing room for the wing between the rail and the floor of the opening 134. In a preferred embodiment, the wing is inserted in the opening 134 with the shoulder joint closest to the circular groove 138 formed in one lateral side of the cart 130, and the cutting mechanism cooperates with the circular groove 138 during operation, as described below. The circular grooves 138 of each of the pairs of carts 130N and 132N may face inwardly toward the other aligned cart in the pair.

The cart 130 is preferably mounted to the chain 110 that is seated against the cart underside 139 with the protruding members 131, 133, 135 and 137 extending upwardly away from the chain in the orientation of FIG. 5. Screws from the chain or from tabs mounted thereto may insert into threaded apertures 232 on the side of the cart 130, but any suitable fastener may be substituted. The chain 110 has a plurality of serially-linked carts 130N that extend from the chain 110 in various directions, depending on the position around the guide 102. A similar plurality of serially-linked carts 132N is arranged on the chain 112 around the guide 104. As the chains 110 and 112 are driven around the periphery of the guides 102 and 104, carts 130N and 132N are likewise positioned at spaced intervals around the guides 102 and 104 and driven there around.

An alternative cart 330 (FIGS. 13-20) has four protruding members 331, 333, 335 and 337, which may be substantially parallel and may define two voids in the spaces therebetween: the opening 334 and the groove 336. The opening 334 extends along an axis that is transverse, and may be substantially perpendicular to, the longitudinal axis of the cart 330, and in operation the opening may receive a wing or other limb of the poultry product being processed. The groove 336 extends along an axis that is substantially parallel to the longitudinal axis of the cart 330 and during operation the groove 336 receives a rail (described below) that retains the wing in the opening 334. The deepest reaches of the groove 336 may not extend as far as the deepest reaches of the opening 334. In a preferred embodiment, the wing is inserted in the opening 334 with the shoulder joint closest to the circular groove 338 formed in one lateral side of the cart 330, and the cutting mechanism cooperates with the circular groove 338 during operation, as described below.

Figure 16:
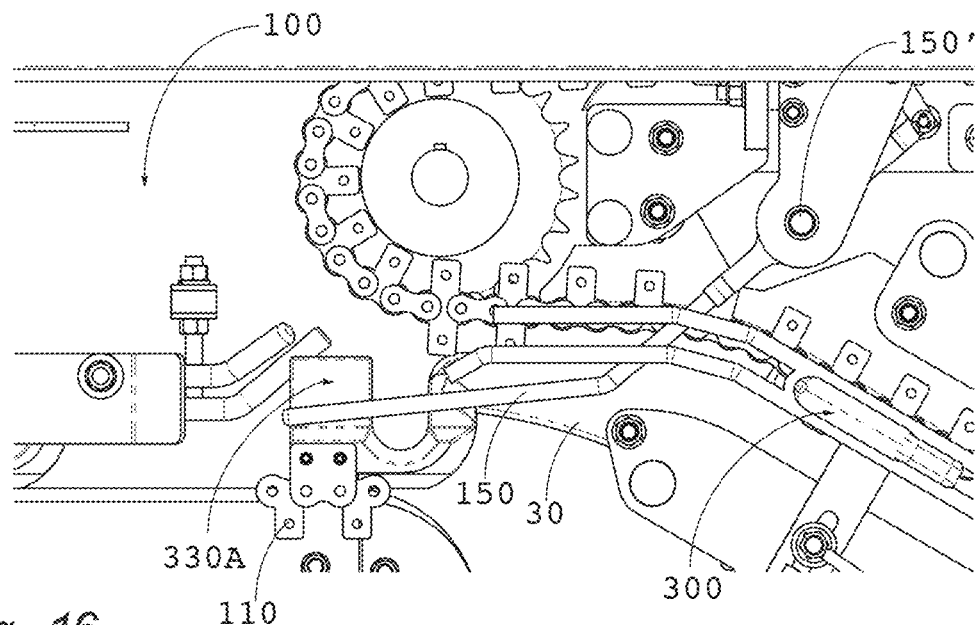
FIG. 16 is a side view in perspective illustrating the transport assembly in further magnification and with some structures removed for enhanced visibility.

The cart 330 may be mounted to the chain 110 that is seated against the underside 339 with the protruding members 331, 333, 335 and 337 extending upwardly away from the chain in the orientation of FIG. 16. Thus, the cart 330 may replace the cart 130 as in FIGS. 16-20. Screws from the chain or from tabs mounted thereto may insert into threaded apertures 332 on the side of the cart 330, but any suitable fastener may be substituted.

Figure 10:
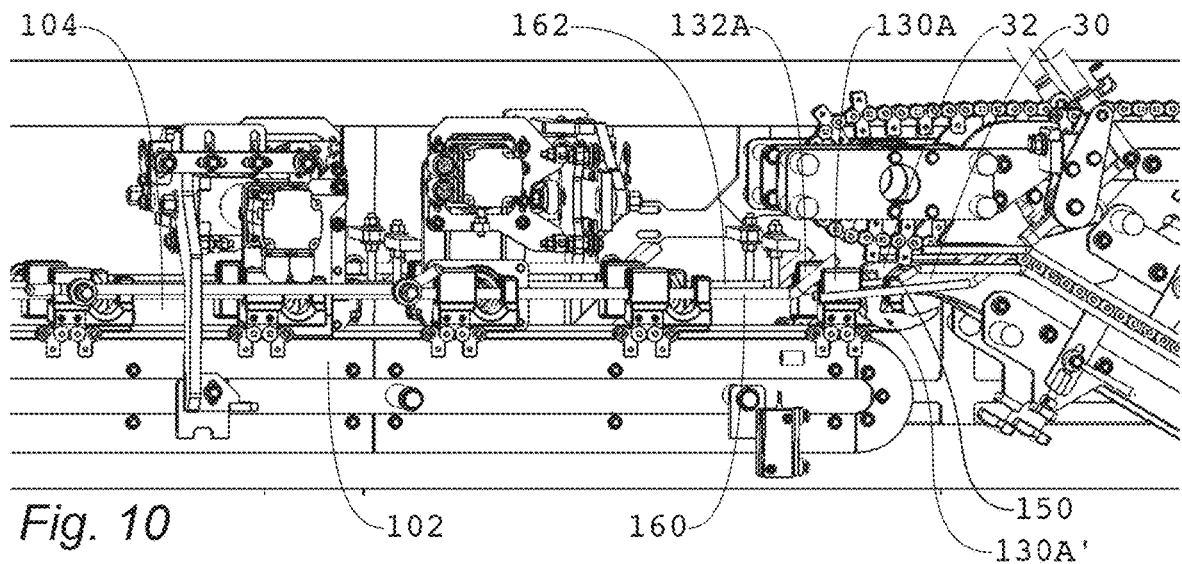
FIG. 10 is a left side view in perspective illustrating the transport assembly of FIG. 2 in further magnification, with some structures removed for enhanced visibility, and with a wings/breast combination disposed in the carts that are in the loading position.

Operation of the transport assembly 100 is as follows. Referring to FIG. 10, a poultry limb, such as a first wing 130A', is disposed in the opening 134 in the cart 130A as the wings/breast combination is driven off of the downstream ends of the guides 30 and 32. A second, opposing wing (not visible in FIG. 10), which is connected to the same breast muscle as the wing 130A', is mounted in the adjacent cart 132A that is on the guide 104 and laterally aligned with, and parallel to, the cart 130A that is positioned on the guide 102. The wings are connected by breast muscle in one embodiment, and the combination of a breast and two wings is driven off the downstream ends of the guides 30 and 32 simultaneously into the respective aligned openings 134 in the carts 130A and 132A. The opposing wings of a wings/breast combination driven off of the guides 30 and 32 are thus disposed in the openings 134 of the respective carts 130A and 132A, which openings are aligned laterally on the guides 102 and 104 at the upstream end of the transport assembly 100. FIG. 10 shows the carts 130A and 132A in the transport assembly 100 in the loading position where they receive wings/breast combinations.

It is contemplated that the wings/breast combination that is transported to the downstream end of the guides 30 and 32 may simply fall into the respective openings 134 of the carts 130A and 132A after being pushed away from the downstream ends of the guides 30 and 32. In some embodiments, one or two moveable positioning bars are disposed adjacent the downstream ends of each of the guides 30 and 32 to urge the wings into the openings in the carts. The preferred positioning bars 150, 152, 153 and 154 (FIGS. 4 and 5) are movably mounted to the apparatus 10 frame, the guides 30 and 32 or another stable structure by a pivot 150' between the bar 150 and the frame of the apparatus 10, and an equivalent pivot for each of the positioning bars 152, 153 and 154. The pivot 150' (FIG. 5) is the only pivot visible, but the bars 152, 153 and 154 have equivalent pivots.

The positioning bars 150 and 152 extend on opposite, outer lateral sides of the downstream end of the guide 30 and the cart 130A (when the carts 130A and 132A pause adjacent the downstream ends of the guides 30 and 32 in the loading position). The positioning bars 153 and 154 extend on opposite, outer lateral sides of the downstream end of the guide 32 and the cart 132A (when the carts 130A and 132A pause adjacent the downstream ends of the guides 30 and 32 in the loading position).

Each of the positioning bars has elongated sections that intersect the axes of the transverse openings 134 in each of the carts 130N and 132N that are paused adjacent the downstream end (such as the carts 130A and 132A; see FIG. 10) of the guides 30 and 32. In one embodiment, the positioning bars are straight, and in another embodiment each of the positioning bars has two segments angled relative to one another at a point intermediate the bar's length by an angle of about 145 degrees (see FIG. 16). The positioning bars are biased toward the deepest reaches of the openings 134 in the carts paused adjacent the downstream ends of the guides 30 and 32 in order to urge wings of a wings/breast combination toward the floors of the openings 134, as explained below.

The operation of the apparatus is shown in FIGS. 16-20 when the wings/breast combination has been displaced along the guides 30 and 32 after being separated from the rest of the carcass as explained above. This operation is explained at times in relation to just one wing of a wings/breast combination, but it will be understood that each poultry product is contemplated to include a breast with wings attached to opposing sides, and thus the explanation of the operation in regard to one wing is applicable to the opposing wing. As the wings/breast combination approaches the downstream end of the guides 30 and 32, the wing 300 contacts the underside (closest to the pivot) of the positioning bar 150. The positioning bar 152 is not visible in FIG. 16 but it is substantially identical to the positioning bar 150 and mounted on the opposite side of the guide 30 from the positioning bar 150. The positioning bar 152 is contacted at its underside closest to the pivot of the positioning bar 152 by the wing 300. The positioning bars 153 and 154 are similarly contacted by the opposing wing (not visible) that is conveyed along the guide 32 to the end, where the opposing wing contacts the bars 153 and 154.

Figure 17:
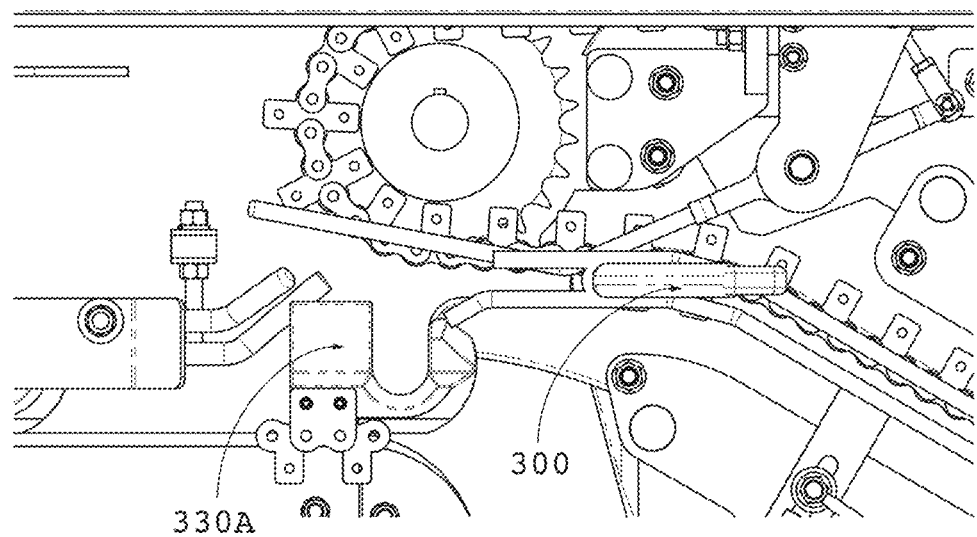
FIG. 17 is a side view in perspective illustrating the transport assembly in further magnification and with some structures removed for enhanced visibility, and advanced from the illustration of FIG. 16.

The positioning bar 150 is shown at its lowest position in FIG. 16 just before the wing 300 contacts it and pivots it upwardly, and the positioning bar 150 is shown in FIG. 17 just after the wing 300 has contacted the bar 150 near its pivot 150'. The other positioning bars 152, 153 and 154 respond similarly to a wing being displaced into them.

As shown in FIG. 17, the wing 300 is displaced past the initial contact with the undersides of the positioning bars 150 and 152, and thereby displaces the bars 150 and 152 further upwardly away from the openings 334 of the cart 330A (and the equivalent, aligned cart) against the downward (in the orientation shown in FIG. 17) bias of the positioning bars as they rotate about the pivot 150' and an identical pivot on the bar 152. A similar movement occurs with the opposing wing against the positioning bars 153 and 154. At initial contact, the path of the wing 300 is transverse to the section of the positioning bar 150, and is less than 180 degrees relative to the path of the wing, which causes the wing 300 to displace the positioning bar 150 (and bar 152) upwardly in the orientation of FIG. 17.

As the poultry product is displaced further toward the downstream end of the guides 30 and 32 in the embodiment shown, the wing 300 reaches a section of the positioning bar 150 that is angled relative to the section the wing 300 first contacts (that is closest to the pivot 150'). Once the wing 300 passes this angle, which is when the wing 300 is just past the position shown in FIG. 17 and just before the position shown in FIG. 18, the section of the positioning bar 150 that is in contact with the wing 300 is angled relative to the path of travel of the wing 300 more than 180 degrees, which causes the bar 150 to begin to move downwardly toward the cart 330A. This occurs as the wing 300 approaches the end of the guide 30, where the wing will depart the guide 30. Thus, the bars 150 and 152 (and the bars 153 and 154) begin to lower as the wing 300 and the wing on the guide 32 begin to depart the guides 30 and 32 and move downwardly toward the carts.

Figure 18:
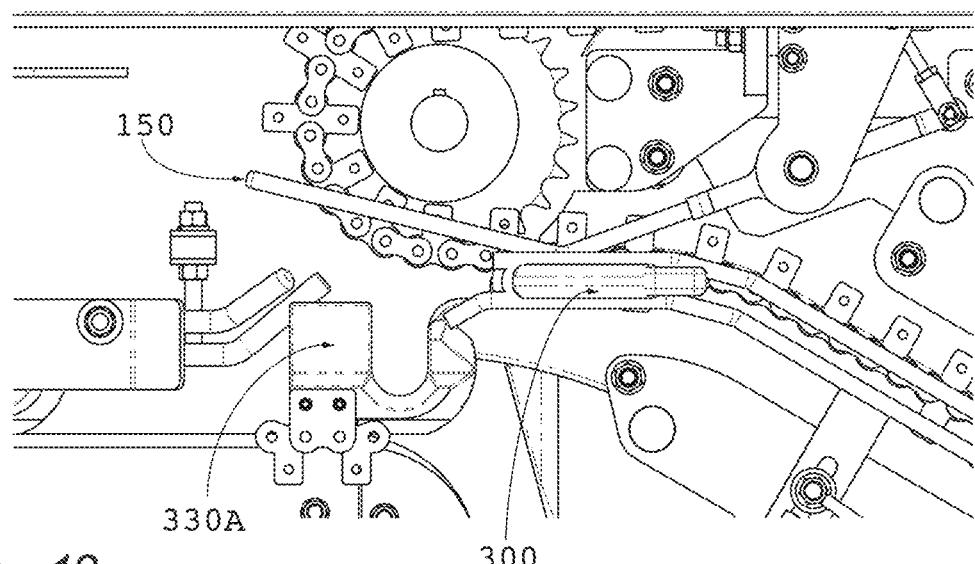
FIG. 18 is a side view in perspective illustrating the transport assembly in further magnification and with some structures removed for enhanced visibility, and advanced from the illustration of FIG. 17.
Figure 19:
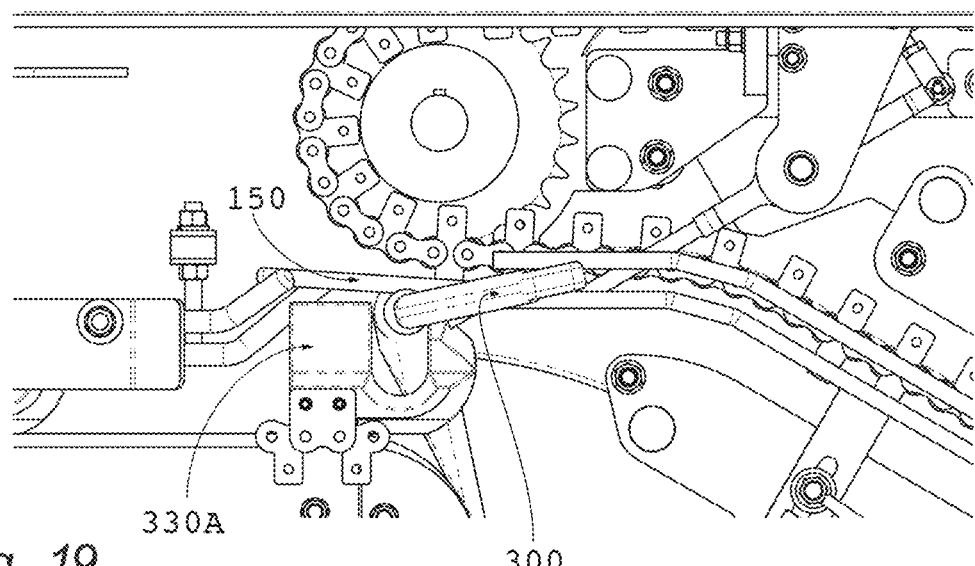
FIG. 19 is a side view in perspective illustrating the transport assembly in further magnification and with some structures removed for enhanced visibility, and advanced from the illustration of FIG. 18.
Figure 20:
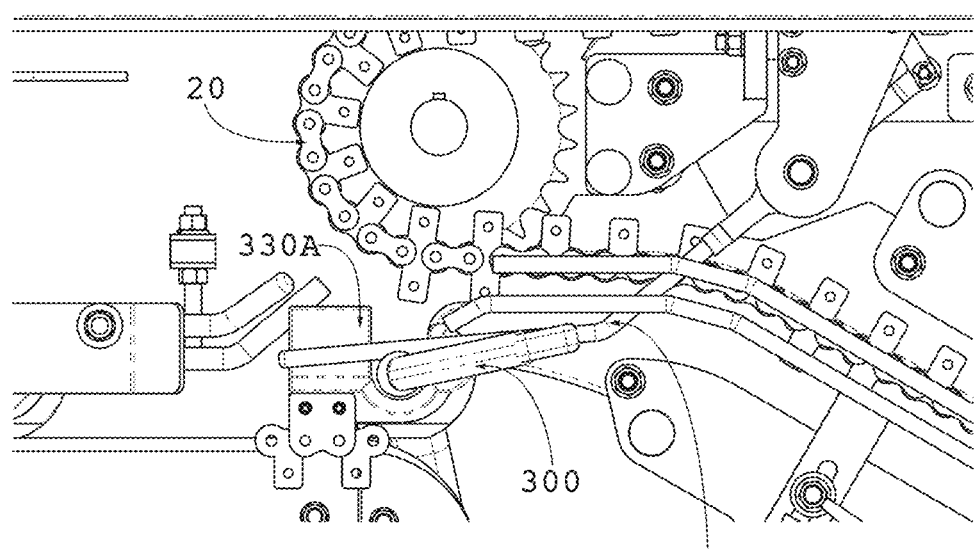
FIG. 20 is a side view in perspective illustrating the transport assembly in further magnification and with some structures removed for enhanced visibility, and advanced from the illustration of FIG. 19.
Figure 21:
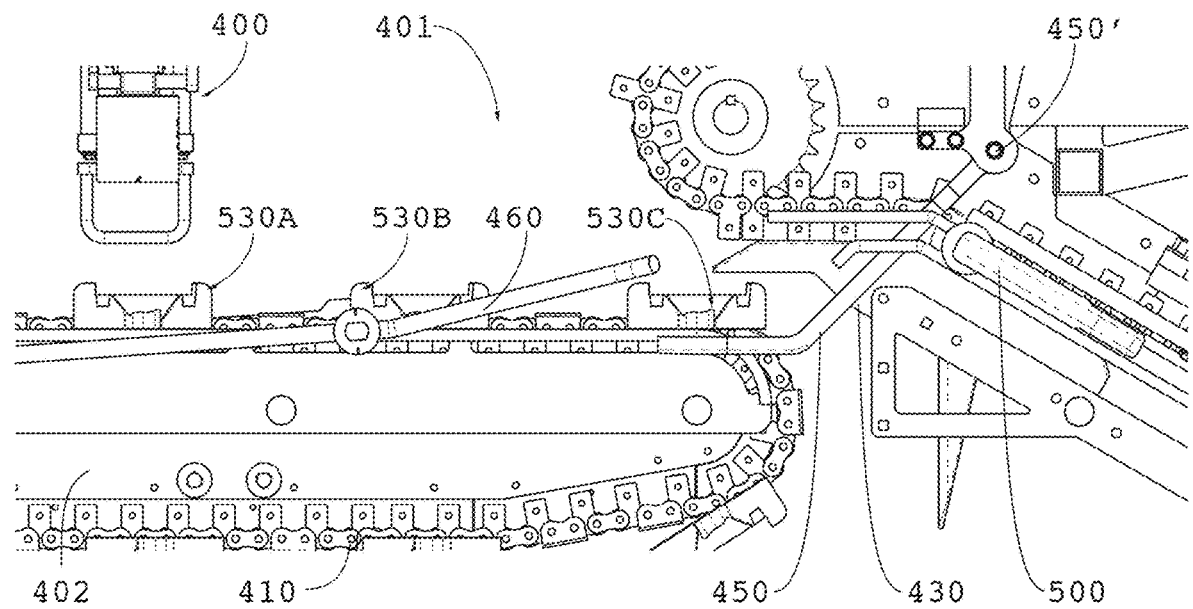
FIG. 21 is a side view in perspective illustrating an alternative embodiment of the transport assembly.

During the declining movement of the wings, the bias of the positioning bars on opposite sides of each of the guides 30 and 32 exerts a downward force on the positioning bars and against each wing, causing the positioning bars to follow the wings' downward movement as the bars apply a downward force to the wings (FIG. 18). As the poultry product departs from the downstream end of the guides 30 and 32 (FIG. 19), the positioning bars continue to apply downward pressure on both sides of each of the wings. This equal pressure on both sides of the wings urges the wings to maintain their orientation and continue their downward movement into the carts even after the wings depart the downstream ends of the chains 20 and 22 and the guides 30 and 32. There is desirably no rotation of the wings about the longitudinal axis along which the wing is displaced during this transition due to pressure being applied substantially equally on both sides of each wing by the positioning bars. That is, there is no lateral pivoting of the wing when the positioning bars on opposite sides of each of the guides apply an equal downward force to each wing. The wings thereby enter into the openings of the carts (FIG. 20) in the same orientation (drumette horizontal) as when they were in the guides 30 and 32. As the chains 20 and 22 that transport the wings/breast combination to the downstream ends of the guides 30 and 32 pull away from the wings/breast combination, and thus cease to propel the combination, the combination continues to be pushed downwardly by the positioning bars 150, 152, 153 and 154 into the upwardly-facing cart openings.

The deepest regions of the openings 334 of the cart 330A and its aligned cart are preferably disposed lower than, and downstream of, the downstream ends of the guides 30 and 32, as shown in FIG. 16 in the loading position. In this way, even after the chain drive system of the guides 30 and 32 has released the wings of each wings/breast combination, the downwardly-biased positioning bars urge the wings downwardly into the cart openings.

The bias on the positioning bars 150, 152, 153 and 154 may be caused by a spring (mechanical, pneumatic, magnetic or any other type) that exerts a force urging the positioning bars to the most downward positions shown in FIGS. 4 and 5 once the positioning bars are pivoted upwardly away from those positions. Alternatively, a mass or a prime mover 10 may exert a force to create the bias. Regardless of how the bias is exerted, the downward force against the positioning bars is applied to the tops of the wings and pushes down on the wings as the wings are raised upwardly against the positioning bars. This bias then forces the wings downwardly to seat the wings evenly in the openings of the carts.

Once the wings 130A' and 132A' of the wings/breast combination are disposed in the openings 134 of the carts 130A and 132A when in the loading position (FIG. 10), the carts 130A and 132A are advanced by the chains 110 and 112 to a first downstream position. The first downstream position may be a holding area where no action is performed on the combination, or it may be an area where another action is performed. Nevertheless, during the movement of the just-filled carts 130A and 132A from the upstream end of the guides 102 and 104 (the loading position), to the first downstream position, no wings are loaded into any carts. However, once the just-filled carts are paused at the first downstream position, another pair of carts 130B and 132B (just upstream on the chains 110 and 112 from the carts 130A and 132A) is positioned at the upstream end of the guides 102 and 104 in the loading position. If the guides 30 and 32 have a wings/breast combination ready, the wings thereof will be inserted in the next upstream pair of carts 130B and 132B in the same manner as the just-filled carts 130A and 132A were filled. This loading continues sequentially with carts 130C (see FIG. 11), 130D, 130E (see FIG. 12) receiving the wings 130C', 130D', 130E', respectively (and their corresponding wing on the opposite side of the breast) and any subsequent wings. Carts 130N and 132N are filled until the apparatus 10 stops or there is no poultry product in the guides 30 and 32.

Figure 11:
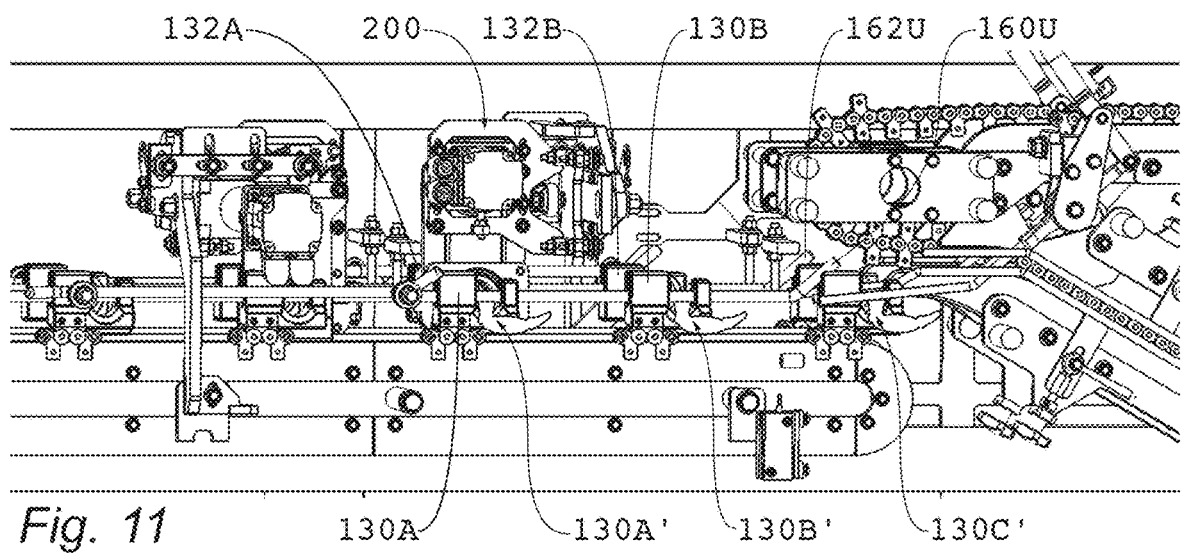
FIG. 11 is a left side view in perspective showing the transport assembly of FIG. 10 advanced two positions, and with wings/breast combinations disposed in three pairs of carts.
Figure 12:
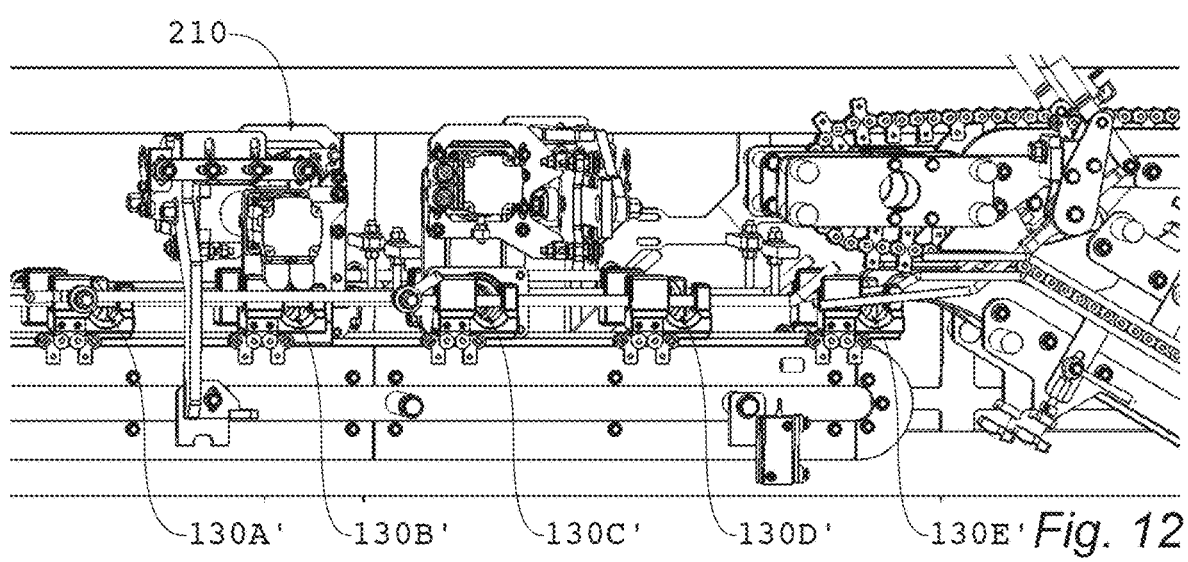
FIG. 12 is a left side view in perspective illustrating the transport assembly of FIG. 11 advanced two positions, and with wings/breast combinations disposed in five pairs of carts.

In the embodiment shown in FIGS. 10-12, the rails 160 and 162 are mounted to the apparatus 10 frame and disposed substantially parallel to the tops of the respective guides 102 and 104, and thus parallel to the respective longer, horizontal spans of the chains 110 and 112 and the direction of movement of the carts. The rails 160 and 162 extend through the upwardly-facing grooves 136 formed in the carts. The rails have inclined upstream ends 160U and 162U to guide the wings downward into the deepest reaches of the openings 134. Thus, as the carts are displaced downstream from the loading position, the inclined ends 160U and 162U of the rails force the wings into, and then the remainders of the rails maintain the wings in, the floors of the openings 134. Each wing is thereby held in, and moved along by, a respective cart attached to one of the chains 110 and 112, with the breast muscle draped between the spaced carts. The rails 160 and 162 prevent the wings from slipping out of the carts due to the weight of the breast muscle or any other force. The rails 160 and 162 extend nearly the length of the guides 102 and 104 to retain the wings in the carts during displacement along the transport assembly 100.

At some position on the transport assembly 100 downstream of the loading position, the wings are severed from the breast muscle. This may occur at the first downstream position after, or may be several downstream positions after, the loading position. Regardless of the number of pauses and movements by the transport assembly 100 after the carts are loaded, one or both of the wings are separated from the breast muscle at a cutting station that corresponds to a downstream position, at which a pair of moveable cutting devices is mounted. In the embodiment of FIGS. 10-12, the cutting station begins at the second downstream position from the loading position, but this is not critical. The chains 110 and 112 advance the carts and poultry products, then pause to load carts that are in the loading position, then move again to index the carts in tandem away from the loading position and toward the cutting stations and beyond. The chains 110 and 112 may move each aligned pair of carts into a first cutter's path at one downstream position and then into a second cutter's path for the other wing cut at a different downstream location so that the wings of a given combination are cut in two sequential steps in two different, sequential downstream positions on the transport assembly 100.

Along the path that the carts pass through, and corresponding to a downstream position where the carts stop moving momentarily, two cutting mechanisms move in a controlled manner along a horizontal, lateral path toward, and then away from, each of the carts. The cutting mechanisms 200 and 210 (FIGS. 5-6) are spaced longitudinally along the upper path, and may be positioned inside a gap between the chains 110 and 112 so the cutters move outwardly from the middle. However, this positioning is not critical. As the carts pause at a respective downstream position, a cut is made to one joint. The timing of the cutting step is important, and occurs when the transport assembly 100 pauses, which corresponds to when another wings/breast combination is loaded on a pair of upstream carts. There may be a sensor to signal a computer to move the cutting mechanisms 200 and 210 at the precise moment desired.

In FIG. 11, the wings/breast combination of which the wing 130A' is a part is in a position for the distal wing (not visible in FIG. 11) to be cut away from the breast by the first cutter 200. In one embodiment, the cutter 200 includes a rotary prime mover, such as an electric servo motor, to which a circular blade is mounted. Upon actuation, and while the chains 110 and 112 are paused, the rotary blade is rotated (or is already rotating) and the cutter 200 is displaced along the axis of the circular blade into the cart 132A, preferably at the circular groove 138 formed in one side (see FIG. 7) that faces inwardly. The circular blade is preferably substantially the same diameter as the circular groove 138 and preferably extends into the groove 138, seating against the preferably low friction polymer face that defines the cavity 138 after severing the tissue that is in and adjacent the groove 138, so that the cut is in the manner of a knife against an anvil. Thus, the blade seats against the cart 132A after severing the connective tissue between the corresponding, attached breast and the wing that is positioned in the cart 132A. The rotary blade is then displaced away from the cart 132A.

The carts 130A and 132A are next displaced to the next downstream position, which is the station shown in FIG. 12 having the wing 130W in a next downstream position. When any cart, such as the cart 130B, is at this position, the chains 110 and 112 are paused and the cutter 210 is actuated so that a rotary blade is rotated (or is already rotating) and displaced into the cart 130B along the axis of the blade, preferably at the circular groove 138 formed in one side (see FIG. 7) that faces inwardly. As the blade seats against the cart 130B, this severs the connective tissue between the breast and the wing. The rotary blade is next displaced away from the cart 130B and the pair of aligned carts is displaced to the next downstream position, which is shown in FIG. 12 where the wing 130A' is located.

Once fully severed from both previously-attached wings, the breast muscle falls between the guides 102 and 104 onto a conveyor below the transport assembly 100. The wings may fall onto a chute directed onto the same or a different conveyor. The wings may remain in the carts under the rails 160 and 162 until the rails separate from the carts where the chains 110 and 112 reach the ends of their downstream spans and begin their upstream span. Each wing may thus be held in each cart by the rails 160 and 162 that are disposed above the U-shaped cart openings that receive each wing, and once the wings reach the downstream ends of the rails 160 and 162, the wings may fall onto a chute that directs them onto a conveyor below.

In summary, therefore, after a wings/breast combination is transferred from the guides 30 and 32 into the transport assembly 100, a pair of aligned carts at the loading position receives and then displaces the wings/breast combination to a downstream position at which a first wing is severed from the breast. The breast (attached only to one wing at this time) is indexed along with both wings to another downstream position, at which the second wing is severed from the breast. The breast then drops downwardly from the transport assembly 100 onto an awaiting conveyor while the wings are retained in the carts by the rails. The wings may be allowed to fall immediately after the breast is severed therefrom, but in a preferred embodiment the wings are not released from their respective carts until the breast is fully severed from the wings and the wings have reached a position farther downstream.

While it is contemplated to dispose positioning bars on both sides of each of the guides 30 and 32 of the structure 14 that convey a poultry product to a transport assembly, it is also contemplated to have only one positioning bar on one, such as the outer, side of each guide. This may be desired when processing larger birds, such as turkeys. An alternative transport assembly 401 is shown in FIGS. 21-27 around the loading position. This embodiment may be used for processing one or more turkey wings/breast combinations. The transport assembly 401 may be substantially identical to the transport assembly 100 except for differences noted herein, and may be used in cooperation with components of the apparatus 10. In one embodiment, the transport assembly 40 I may be larger and spaced differently than the transport assembly 100 due to the use of the transport assembly 401 with larger birds, such as turkeys.

Figure 28:
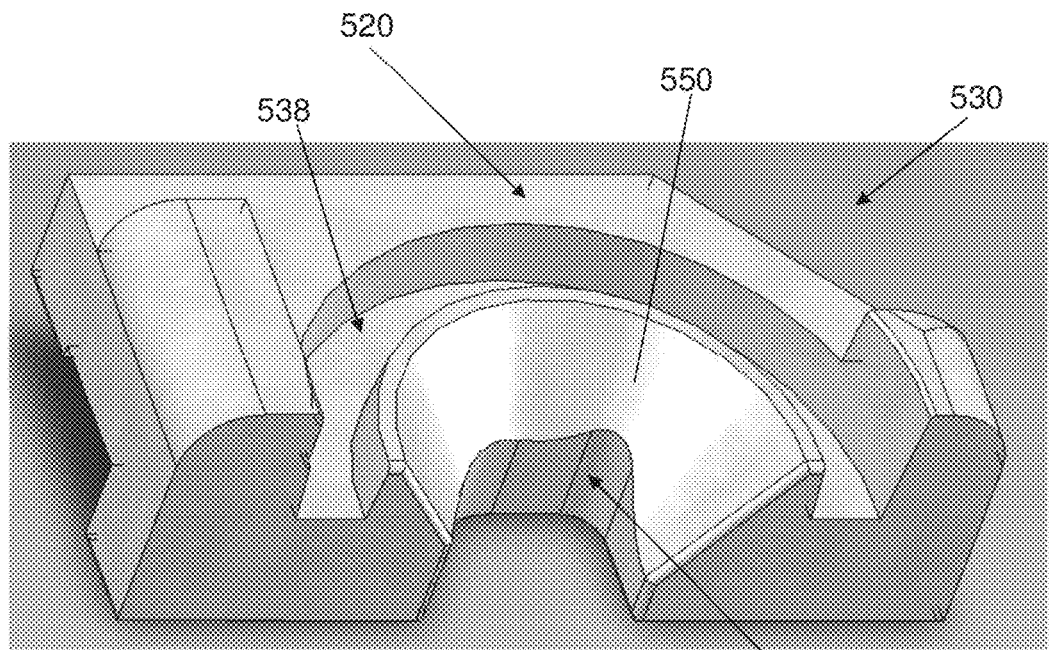
FIG. 28 is a view in perspective illustrating the top of an alternative embodiment of the cart.
Figure 29:
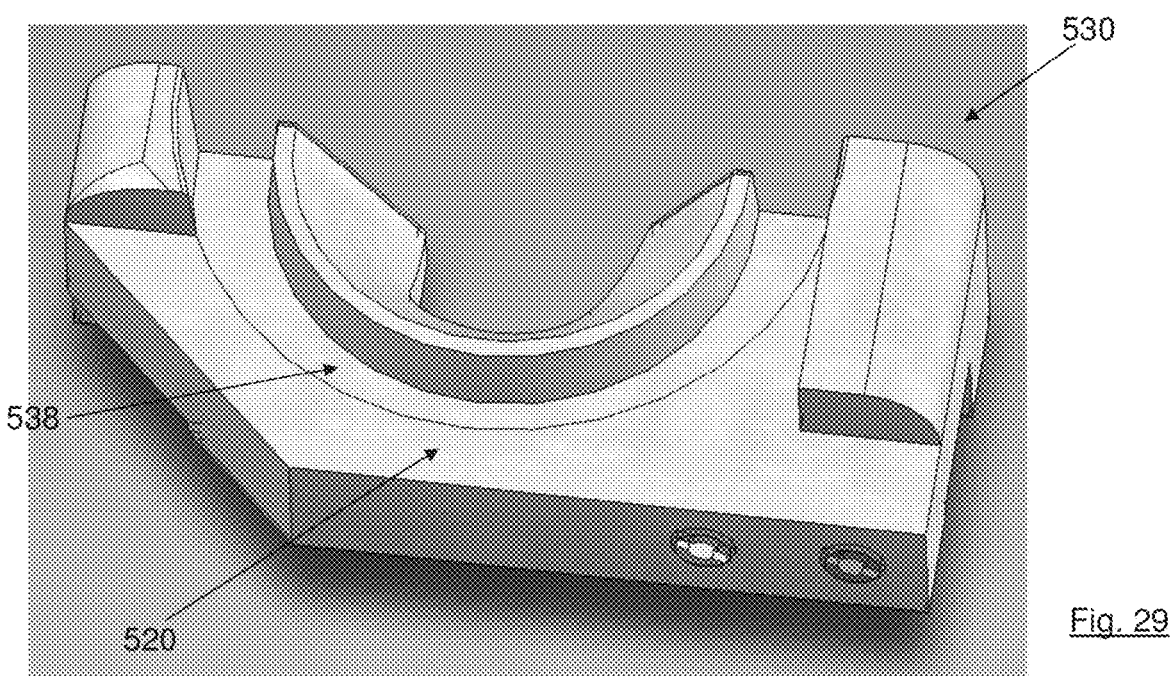
FIG. 29 is a view in perspective illustrating the top of the embodiment of FIG. 28.

There may be alternative carts in the transport assembly 401 that differ from the carts 130 and 330. The alternative carts 530A-530E in FIGS. 21-27 are substantially identical to one another, and are represented by the example cart 530 shown in detail in FIGS. 28-30. The carts 530A-530E may be mounted to a chain 410 that extends around the guide 402, which is similar to the guide 102. The underside 539 of the cart 530 may be attached to the chain 410 with the conical surface 550 facing substantially upwardly when in an operable position to receive a turkey wing 500 as shown in FIGS. 23-27. The conical surface 550 defines an opening 534 in which a poultry wing may be held during processing.

The positioning bar 450 extends on one lateral side of the downstream end of the guide 430 and the carts 530A-530E. FIGS. 21-25 show the positioning bar 450 when the carts 530A-530E pause in the loading position adjacent the downstream ends of the structure 14, of which the guide 430 is a part. Another equivalent positioning bar may extend on an opposite, outer lateral side of a downstream end of a second guide (not shown but equivalent to the guide 430) and a second cart (not shown but positioned relative to the second guide where the cart 530C is positioned relative to the guide 430) when the first cart 530C and the second cart pause adjacent the downstream ends of the first guide 430 and the second guide in the loading position. The first guide 430 and the second guide (not visible) are substantially the same as the guides 30 and 32 of the structure 14. Only the guide 430 and associated components are described herein in detail. The second guide and associated components are the same unless notedotherwise.

Each cart 530N, where "N" represents a variable assigned to each cart to distinguish it from all other serially-connected and substantially identical carts, conveys the associated wing downstream along the guide 402. It will be understood that all carts of the embodiment of FIGS. 21-27 not noted herein as differing from the cart 530 have similar features to the cart 530.

The positioning bar 450 has an elongated section that is disposed adjacent the opening 534 in each of the carts 530N that are paused adjacent the downstream end of the guide 430 in the loading position. In one embodiment, the positioning bar is straight, and in another embodiment the positioning bar 450 has two segments angled relative to one another intermediate the length by an angle of about 145 degrees (see FIG. 21). The positioning bar 450 is biased toward the opening 534 of the cart, and more specifically the cart 530C paused adjacent the downstream end of the guide 430, in order to urge the wing 500 of a wings/breast combination into contact with the surface 550, as explained below.

Figure 22:
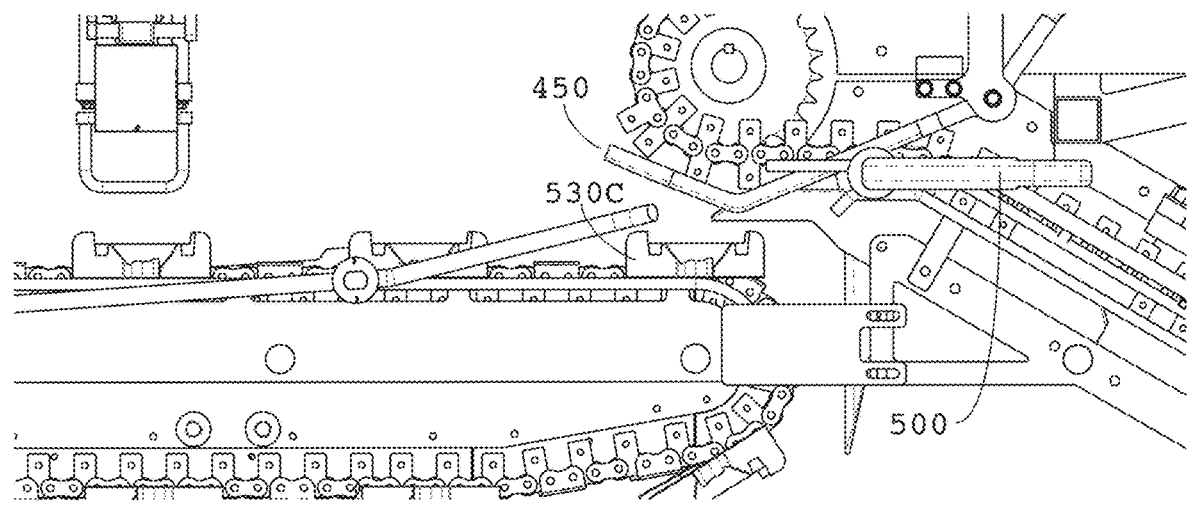
FIG. 22 is a side view in perspective illustrating an alternative embodiment of the transport assembly, and advanced from the illustration of FIG. 21.
Figure 23:
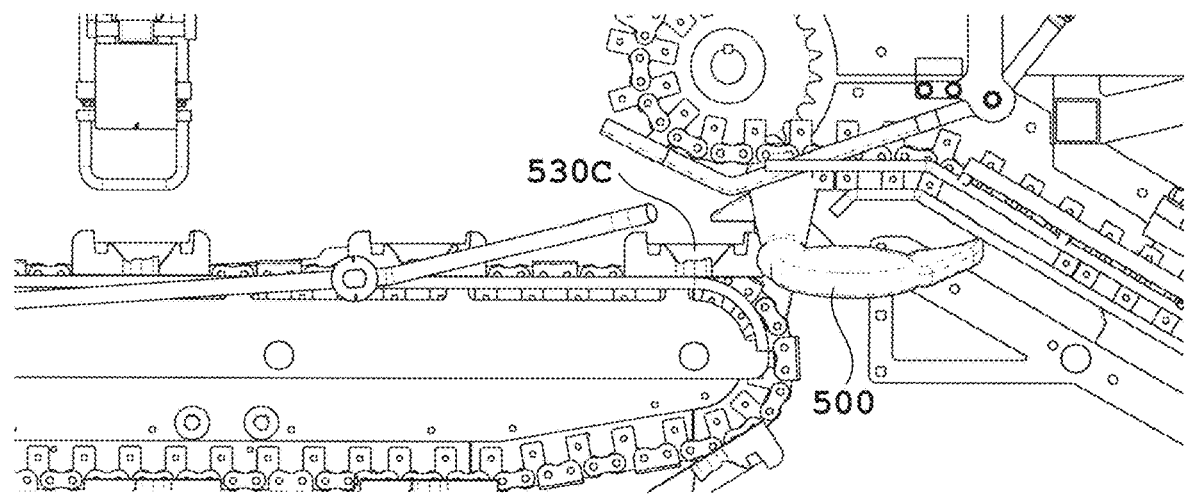
FIG. 23 is a side view in perspective illustrating an alternative embodiment of the transport assembly, and advanced from the illustration of FIG. 22.
Figure 24:
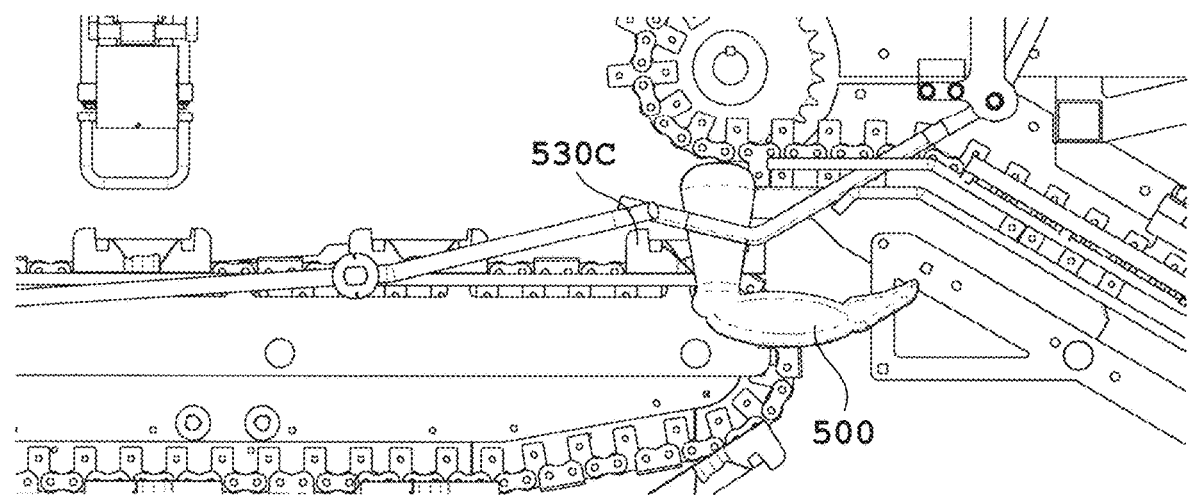
FIG. 24 is a side view in perspective illustrating an alternative embodiment of the transport assembly, and advanced from the illustration of FIG. 23.

The operation of the transport assembly 401 is explained herein and shown in FIGS. 21-27. The wing 500 of the wings/breast combination is displaced along the guide 430 after being separated from the rest of the carcass as explained above. As the wing 500 approaches the downstream end of the guide 430, the wing 500 contacts the underside (closest to the pivot 450') of the positioning bar 450. A second positioning bar is not visible in FIGS. 21-27, but it is substantially identical to the positioning bar 450 and may be contacted at its underside closest to the pivot by a wing on the opposite side of the breast from the wing 500. The positioning bar 450 is shown at its lowest position in FIG. 21 just before the wing 500 contacts it and pivots it upwardly, and the positioning bar 450 is shown in FIG. 22 shortly after the wing 500 has contacted the positioning bar 450 near its pivot 450'.

As shown in FIG. 22, the wing 500 is displaced past the initial contact with the underside of the positioning bar 450, and thereby displaces the bar 450 further upwardly away from the cart 530C against the downward (in the orientation shown in FIG. 22) bias of the bar as it rotates about the pivot 450'. At initial contact, the path of the wing 500 is transverse to the section of the positioning bar 450, and is less than 180 degrees, which causes the wing 500 to displace the positioning bar 450 upwardly.

As the poultry product is displaced further toward the downstream end of the guide 430 in the embodiment shown, the wing 500 reaches a section of the positioning bar 450 that is angled relative to the section the wing 400 first contacted (that is closer to the pivot 450'). Once the wing 500 passes this angled section, which is just past the position shown in FIG. 23 and just before the position shown in FIG. 24, the section of the positioning bar 450 that is in contact with the wing 500 is angled relative to the path of travel of the wing 500 more than 180 degrees, which causes the bar 450 to begin to move downwardly toward the cart 530C. This occurs as the wing 500 approaches the end of the guide 430, where the wing will depart the guide 430. Thus, the positioning bar 450 begins to lower as the wing 500 begins to depart the guide 430 and moves downwardly toward the cart 530C.

During the departing movement of the wing 500, the downward bias of the positioning bar 450 causes the bar to follow the wing's downward movement along the downwardly-angled end of the guide 430. The positioning bar thus applies a downward force on the wing. As the wing departs from the downstream end of the guide 430 (FIGS. 24-25), the positioning bar continues to apply downward pressure on one side of the wing. This pressure urges the wing to continue its downward movement into the cart 530C even after the wing departs the downstream end of the chain 420 and the guide 430.

Figure 25:
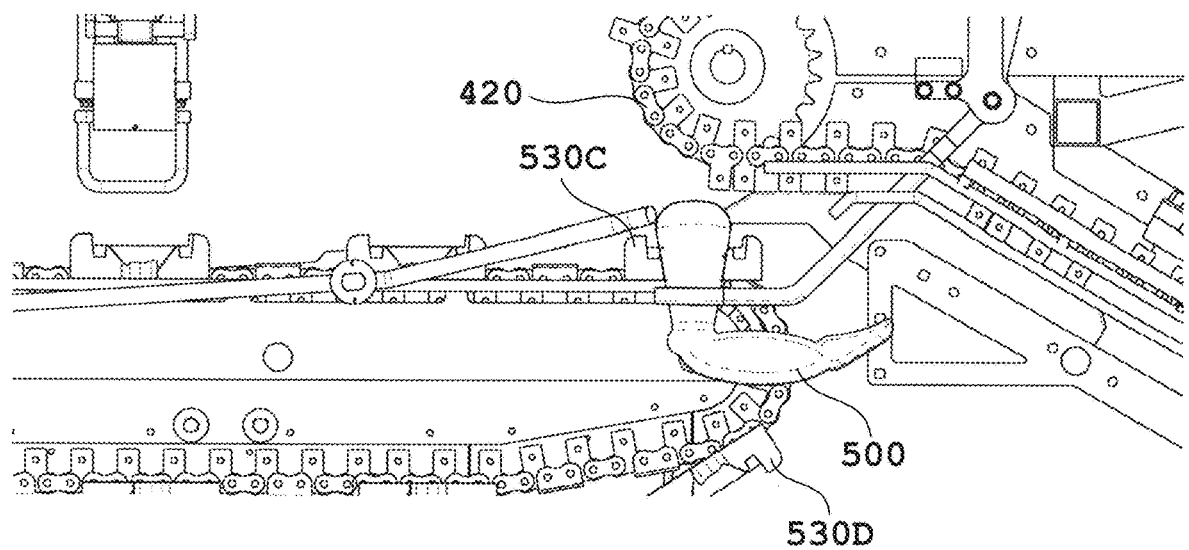
FIG. 25 is a side view in perspective illustrating an alternative embodiment of the transport assembly, and advanced from the illustration of FIG. 24.

As the chain 420, which transports one side of the wings/breast combination to the downstream end of the guide 430, pulls away from the wings/breast combination, and thus ceases to propel the combination, the combination continues to be pushed downwardly into the upwardly-facing cart openings by the positioning bar 450, as shown in FIG. 25. By applying the downward force of the positioning bar 450 to one side of the wing only, and preferably to the mid-wing or to the side of the drumette farther from the breast, the wing is caused to rotate about the joint between the drumette and the breast. The rotation of the drumette is about 90 degrees about a longitudinal axis from a substantially horizontal position in the guide 430 (see FIG. 22) to a substantially vertical position in the cart (see FIG. 25). The wing thereby rests upon the surface 550 and possibly the surface 520 of the cart 530C in a rotated position. The rotation may dislocate, even partially, the joint between the breast and the drumette, thereby assisting in cutting through this joint.

The positioning bar 450 thus pivots upwardly against a bias as a wing is driven along the guide 430 (and an equivalent positioning bar responds similarly to a wing driven along a parallel guide) and then downwardly as the wing moves further and then departs the guide 430. The bias on the positioning bar 450 may be caused by a spring (mechanical, pneumatic, magnetic or any other type) that exerts a force urging the positioning bar 450 to the most downward position (shown in FIGS. 21 and 25) after the positioning bar is pivoted upwardly away from that position. Alternatively, a mass or a prime mover may exert a force to create the bias. Regardless of how the bias is exerted, the downward force against the positioning bar 450 is applied to the top of each wing and pushes against the wing as the wing is raised upwardly against the positioning bar. This bias then forces the bar downwardly during the latter portion of the bar's contact with the wing, thereby rotating the drumette portion of the wing and seating the wing in the cart as the wing rotates about 90 degrees as described above.

Once the wing 500 of the wings/breast combination is disposed in the cart 530C when in the loading position, the carts (530C and an equivalent cart holding the other wing) are advanced by the chain 410 (and an equivalent chain on a guide that is parallel to the guide 402) of the transport assembly 401 to a first downstream position. The first downstream position may be a holding area where no action is performed on the combination, or it may be an area where another action is performed. Nevertheless, during the movement of the just-filled carts from the upstream end of the guides (the loading position) to the first downstream position, no wings are loaded into any upstream carts. However, once the just-filled carts are paused at the first downstream position, another cart 530D and a laterally-aligned cart (not shown) are positioned at the upstream end of the guide 402 and the parallel guide (not shown), in the loading position. If the guide 430 and the parallel guide have a wings/breast combination ready, the wings thereof will be inserted in the next upstream cart 530D and aligned cart (not shown) in the same manner as the just-filled cart 530C and aligned cart were filled. This loading continues sequentially with carts 530D, 530E and any other carts serially attached to the chain 410, (and the corresponding guides, chains and carts on the opposite side of the breast muscle and any subsequent carts) until the apparatus 10 stops.

The rail 460 is mounted to the frame of the transport assembly 401 and disposed substantially parallel to the top of the guide 402, and thus substantially parallel to the direction of movement of the carts. An equivalent rail may be disposed adjacent the second, parallel guide. The rails extend adjacent the cart 530N and an equivalent cart mounted on the second, parallel guide. The rail 460 has an inclined upstream end to direct the distal end of the wing beneath the rail as the wings are displaced downstream from the loading position. Thus, as the carts are displaced downstream from the loading position, the inclined ends of the rails direct the distal ends of the wings under the rails in the downward, rotated position shown in FIG. 26, and then the rest of the rails maintain the wings in this position with the breast muscle hanging between the two carts. Each wing is held in, and moved along by, a cart with the breast muscle draped between the spaced carts. The rails prevent the wings from slipping out of the carts. The rails extend nearly the length of the guide 402 to retain the wings in the carts during displacement along the transport assembly 401.

At some position on the transport assembly 401 downstream of the loading position, the wings are severed from the breast muscle. This may occur at the first downstream position after, or may be several downstream positions after, the loading position. Regardless of the number of pauses and movements by the transport assembly 401 after the carts are loaded, the wings are separated from the breast muscle at a cutting station that corresponds to a downstream position, at which a pair of moveable cutting devices is mounted. In the embodiment of FIGS. 21-27, the cutting station begins at the second downstream position from the loading position, but this is not critical. The chains advance the carts and poultry products, then pause to load carts that are in the loading position, then move again to index the carts in tandem away from the loading position and toward the cutting stations and beyond. The chains may move each pair of carts into a first cutter's path at one downstream position and then into a second cutter's path for the other wing cut at a different downstream location so that the wings of a given combination are cut in two sequential steps in two different downstream positions on the transport assembly 401. Alternatively, the wings of a poultry product may be cut simultaneously.

Along the path that the carts pass through, and corresponding to a downstream position where the carts stop moving momentarily, two cutting mechanisms may move in a controlled manner along a vertical path toward, and then away from, each of the aligned carts. The cutting mechanisms are positioned along the path, and may be positioned above the carts so the cutters move downwardly from above along substantially vertical paths.

As the carts pause at a respective downstream position, a cut is made to the joints between the wings and the breast. It is preferred that the individual wings are cut simultaneously on both sides in the transport assembly 401. The timing of the cutting step is important, and occurs when the transport assembly 401 pauses, which corresponds to when another wings/breast combination is loaded on a pair of carts upstream from the cutting station. There may be a sensor to signal a computer to pause downstream movement of the carts of the transport assembly 401 at the precise moment cutting and loading are desired.

Figure 26:
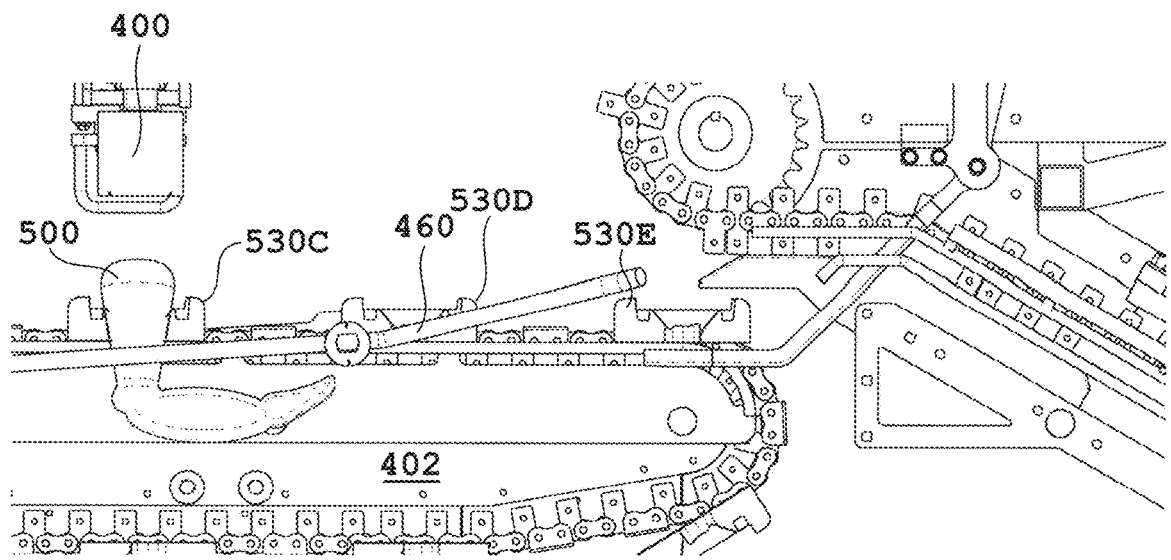
FIG. 26 is a side view in perspective illustrating an alternative embodiment of the transport assembly, and advanced from the illustration of FIG. 25.
Figure 27:
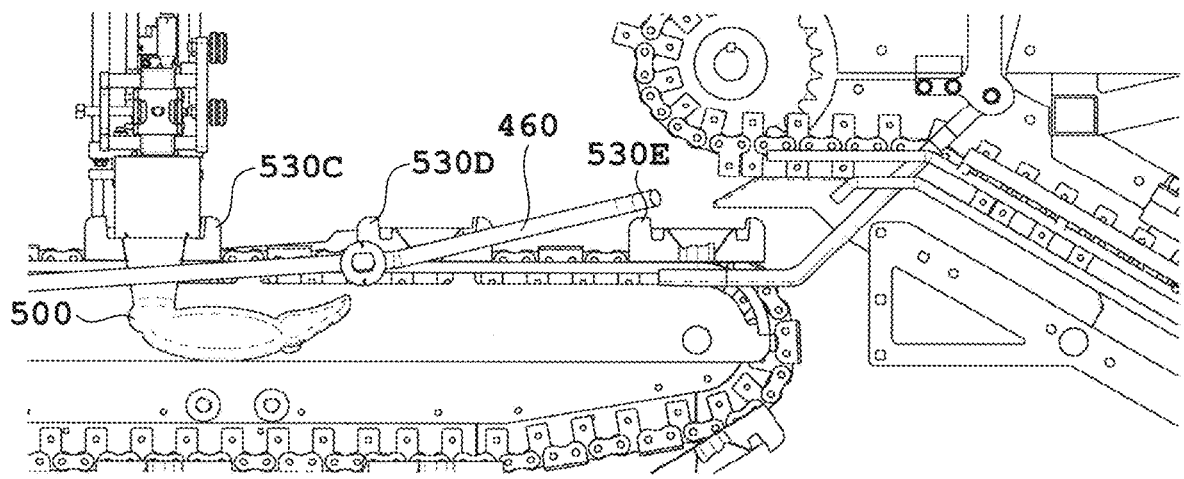
FIG. 27 is a side view in perspective illustrating an alternative embodiment of the transport assembly, and advanced from the illustration of FIG. 26.

In FIG. 26, the wings/breast combination of which the wing 500 is a part is in a position for one of the wings to be cut away from the breast by the cutter 400. The other wing of the combination may be cut away from the breast by an equivalent cutter (not shown). In one embodiment, the cutter 400 includes a rotary prime mover, such as an electric servo motor, to which a circular cylindrical rotary blade is mounted. Upon actuation, and while the carts are paused, the rotary blade is rotated (or is already rotating) and the cutter 400 is displaced along the axis of the circular cylindrical blade into the cart 500, preferably at the circular groove 538 formed in one side (see FIGS. 28-29). The drumette bone is preferably aligned during placement of the wing into the cart so that, upon cutting, the axis of the drumette bone is aligned along the axis of the cutter 400. The circular blade is preferably substantially the same diameter as the circular groove 538 and preferably extends into the groove 538, seating against the preferably low friction polymer face that defines the cavity 538 after severing the tissue that is in or adjacent the groove 538. The cut is in the manner of a knife against an anvil. Thus, the blade seats against the cart 530C after severing the connective tissue between the corresponding, attached breast and the wing that is positioned in the cart 530C. The rotary blade is next displaced away from the cart 530C. The equivalent cutter is actuated simultaneously to sever the connective tissue between the breast muscle and the wing on the aligned cart that holds the other wing of the combination.

Once fully severed from both wings, the breast muscle falls between the guides onto a conveyor below the transport assembly 401. In summary, a wings/breast combination is transferred from the pair of parallel guides into the pair of aligned carts at the loading position of the transport assembly 401 and then is displaced to a downstream position at which the wings are severed from the breast. The breast then drops downwardly from the transport assembly 401 onto an awaiting conveyor while the wings are retained in the carts. The wings may be allowed to fall immediately after the breast is severed therefrom, but in a preferred embodiment the wings are not released from their respective carts until the breast is fully severed from the wings and the wings have reached a position farther downstream.

As shown in FIGS. 4 and 5, the outer guide bars 170 and 172 disposed adjacent the transport assembly 100 preferably extend from rigid attachment to the apparatus 10 frame to a lateral position of each cart. These outer guide bars 170 and 172 may help keep the wing stable while it is being severed from the breast. The tip portions of the wings extend into voids between the guide bars 170 and 172 and the respective carts adjacent thereto in order that the wing tips are stabilized during and after the cutting steps.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

While illustrative embodiments have been illustrated and described, it will be appreciated that various changes can be made therein without departing from the spirit and scope of the invention.

The invention claimed is:

1. A poultry processing apparatus (10) for separating poultry components, the apparatus comprising:
   (a) a guide system (430) for guiding a poultry (500) product including at least a breast and first and second attached wings (500), along the apparatus with the first and second wings resting upon the guide system (430), the guide system having a downstream end section:
   (b) a transport assembly (401) including carts (530) mounted to a drive system (410) for driving the carts (530) from a loading position adjacent the downstream end section of the guide system (430) to a cutting station (400), the carts (530) configured to receive the wings (500) of the poultry (500) product when the carts (530) are disposed in the loading position; and (c) moveable cutters (400) disposed adjacent the transport assembly (401) at a cutting station, the cutters (400) being configured for moving along a path and severing tissue connecting the wings (500) and the breast.

2. The apparatus in accordance with claim 1, further comprising moveable positioning bars mounted adjacent the downstream end portion of the guide system, the positioning bars being biased toward the carts, wherein the bars are configured for moving away from the carts when the wings of the poultry product contact the bars as the wings approach the downstream end portion of the guide system, and the bars are configured for moving toward the carts as the wings depart the downstream end portion of the guide system, the bars thereby urging the wings onto the carts.

3. The apparatus in accordance with claim 2, further comprising second moveable positioning bars mounted adjacent the downstream end portion of the elongated guide system, the second positioning bars being biased in the direction of the cart, wherein the second bars are configured for moving away from the carts when the wings of the poultry product contact the second bars as the wings approach the downstream end portion of the guide system, and the second bars are configured for moving toward the carts as the wings depart the downstream end portion of the guide system, the second bars thereby urging the wings onto the carts.

4. The apparatus in accordance with claim 3, wherein the carts comprising first and second side-by-side carts, one for each of the first and second wings.

5. The apparatus in accordance with claim 3, wherein the cutters are configured for moving along a substantially horizontal path.

6. A poultry processing apparatus (10), the apparatus comprising:
   (a) an elongated, guide system (430) for guiding a plurality of poultry combinations that include at least a breast and first and second attached wings (500) along the apparatus with the first and second wings resting upon the guide system, the guide system (430) having a downstream end portion;
   (b) a transport assembly (401) including a plurality of serially-linked carts (530) attached to an endless loop (410), the loop drivingly linked to a prime mover for driving the loop and the attached carts (530) from a loading position adjacent the downstream end of the guide assembly (430) to a cutting station (400) that is downstream of the loading position, the carts (530) to receive a respective one of the wings (500) of one of the poultry combinations when the cart (530) is disposed in the loading position;
   (c) positioning bars (450) pivotably-mounted adjacent the downstream end portion of the elongated guide system (430), said positioning bars (450) configured to be forced away from the carts as the wings (500) of each poultry combination contact the positioning bars (450) as the wings (500) approach the downstream end portion of the guide system (430), the positioning bars (450) being biased to move toward the carts as the wings depart the downstream end portion of the guides (430), the positioning bars (450) thereby urging the wings onto the carts (530); and
   (d) moveable cutters (400) disposed at a cutting station and configured for moving along a path, seating against the carts (530) and severing tissue connecting the wings (500) and the breast.

7. The apparatus in accordance with claim 6, wherein the cutters are configured to move along a path having a horizontal component.

8. The apparatus in accordance with claim 6, further comprising:
   rails mounted substantially parallel to the spans of the endless loops, the rails mounted within a path through which the plurality of carts pass, wherein the rails define a limit to resist withdrawal of a wing mounted on the corresponding cart.

9. The apparatus in accordance with claim 8, wherein the carts have a longitudinal slot through which a rail passes.

10. A method of processing poultry, the method comprising:
    (a) displacing first and second poultry wings (500), which are attached to a poultry breast, along a guide system (430) having a downstream end portion;
    (b) disposing carts (530), configured to receive the wings (500), at a loading position adjacent the downstream end portion of the guide system (430):
    (c) moving positioning bars (450) mounted adjacent the downstream end portion of the elongated guide system (430) away from the carts (530) as the first and second wings (500) are displaced toward the downstream end portion of the guide system;
    (d) moving the positioning bars (450) toward the carts (530) as the wings (500) depart the downstream end portion of the guide system (430), the positioning bars (450) thereby urging the wings (500) onto the carts (530);
    (e) displacing the carts (530), and the wings (500) held therein, downstream to a cutting station (400);
    (f) moving a first moveable cutter at the cutting station (400) along a path, thereby seating against and severing tissue connecting the first wing (500) and the breast; and
    (g) moving a second moveable cutter at the cutting station (400) along a path, thereby seating the second cutter (400) against and severing tissue connecting the second wing (500) and the breast.

11. The method in accordance with claim 10, wherein the steps of moving the first and second cutters are carried out substantially simultaneously.

12. The method in accordance with claim 10, wherein the steps of moving the first and second cutters are carried out sequentially, wherein the steps of moving the first and second paths, each of which has a horizontal component.

* * * * *